US009473229B2

(12) United States Patent
Yin et al.

(10) Patent No.: US 9,473,229 B2
(45) Date of Patent: Oct. 18, 2016

(54) HIGH-THROUGHPUT BEAMFORMING MIMO RECEIVER FOR MILLIMETER WAVE COMMUNICATION AND METHOD

(71) Applicant: Samsung Electronics Co., LTD, Suwon-si, Gyeonggi-do (KR)

(72) Inventors: Bei Yin, Houston, TX (US); Gary Xu, Allen, TX (US); Eran Pisek, Plano, TX (US); Shadi Abu-Surra, Plano, TX (US); Thomas Henige, Plano, TX (US); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 14/042,169

(22) Filed: Sep. 30, 2013

(65) Prior Publication Data

US 2014/0098912 A1  Apr. 10, 2014

Related U.S. Application Data

(60) Provisional application No. 61/710,477, filed on Oct. 5, 2012.

(51) Int. Cl.
*H04L 27/08* (2006.01)
*H04B 7/08* (2006.01)
(Continued)

(52) U.S. Cl.
CPC ............ *H04B 7/088* (2013.01); *H04B 7/0417* (2013.01); *H04B 7/0695* (2013.01); *H04L 25/021* (2013.01); *H04L 25/025* (2013.01); *H04L 25/067* (2013.01); *H04L 27/2663* (2013.01); *H04L 27/2671* (2013.01); *H04L 27/2678* (2013.01); *H04L 27/2695* (2013.01)

(58) Field of Classification Search
CPC .......... H04L 27/2678; H04L 27/2607; H04L 27/2662; H04L 27/2663; H04L 25/021; H04L 25/025; H04L 27/2656; H04L 27/2695; H04B 7/0417; H04B 7/088; H04B 7/0452
USPC ................................ 375/260, 267, 345, 349
See application file for complete search history.

(56) References Cited

U.S. PATENT DOCUMENTS

2007/0066220 A1   3/2007  Proctor, Jr. et al.
2007/0143065 A1*  6/2007  Griffin .............. B60R 21/01534
                                                                    702/152

(Continued)

FOREIGN PATENT DOCUMENTS

WO   WO 2008/147910 A1   12/2008
WO   WO 2011/148341 A1   12/2011
WO   WO 2012/117374 A1    9/2012

OTHER PUBLICATIONS

International Search Report dated Jan. 28, 2014 in connection with International Patent Application No. PCT/KR2013/008885, 3 pages.

(Continued)

*Primary Examiner* — Rahel Guarino

(57) ABSTRACT

A receiver in a communication system is provided that includes a synchronization module and a channel estimator. The synchronization module is configured to identify an end of a cyclic prefix (CP) in a received signal using slope detection by monitoring a detection metric threshold in the received signal. The channel estimator is configured to estimate a complex noise variance using guard band subcarriers.

18 Claims, 13 Drawing Sheets

(51) Int. Cl.
  *H04B 7/04*   (2006.01)
  *H04B 7/06*   (2006.01)
  *H04L 27/26*  (2006.01)
  *H04L 25/02*  (2006.01)
  *H04L 25/06*  (2006.01)

(56) References Cited

U.S. PATENT DOCUMENTS

| | | | | |
|---|---|---|---|---|
| 2008/0101488 A1* | 5/2008 | Wilhelmsson | ............ | H04L 1/20 375/260 |
| 2010/0260294 A1* | 10/2010 | Zhengang | ........... | H04L 27/2678 375/343 |
| 2010/0284339 A1* | 11/2010 | Noh | .................... | H04L 27/2607 370/328 |
| 2010/0311346 A1* | 12/2010 | Lindoff | ................ | H04J 11/0073 455/67.11 |

OTHER PUBLICATIONS

Written Opinion of International Searching Authority dated Jan. 28, 2014 in connection with International Patent Application No. PCT/KR2013/008885, 4 pages.

Partial Supplementary Search Report dated Jul. 5, 2016 in connection with European Application No. 13844179.5, 7 pages.

Liu, et al., "An Improved Joint Time and Frequency Offset Estimation for OFDM Systems in Multipath Fading Channel", 2011 7th International Conference on Wireless Communications, Networking Mobile Computing (WICOM), Sep. 23, 2011, 4 pages.

Timothy M. Schmidl, et al., "Robust Frequency and Timing Synchronization for OFDM", Dec. 1, 1997, vol. 45, No. 12, 9 pages.

Kui Xu, et al., "A Novel Carrier Frequency Offset Tracking Algorithm for OFDM Systems Using LS-ICA and Fractional Sampling", 2008 International Conference on Commuications, Circuits, and Systems, IEEE, Piscataway, New Jersey, May 25, 2008, 5 pages.

\* cited by examiner

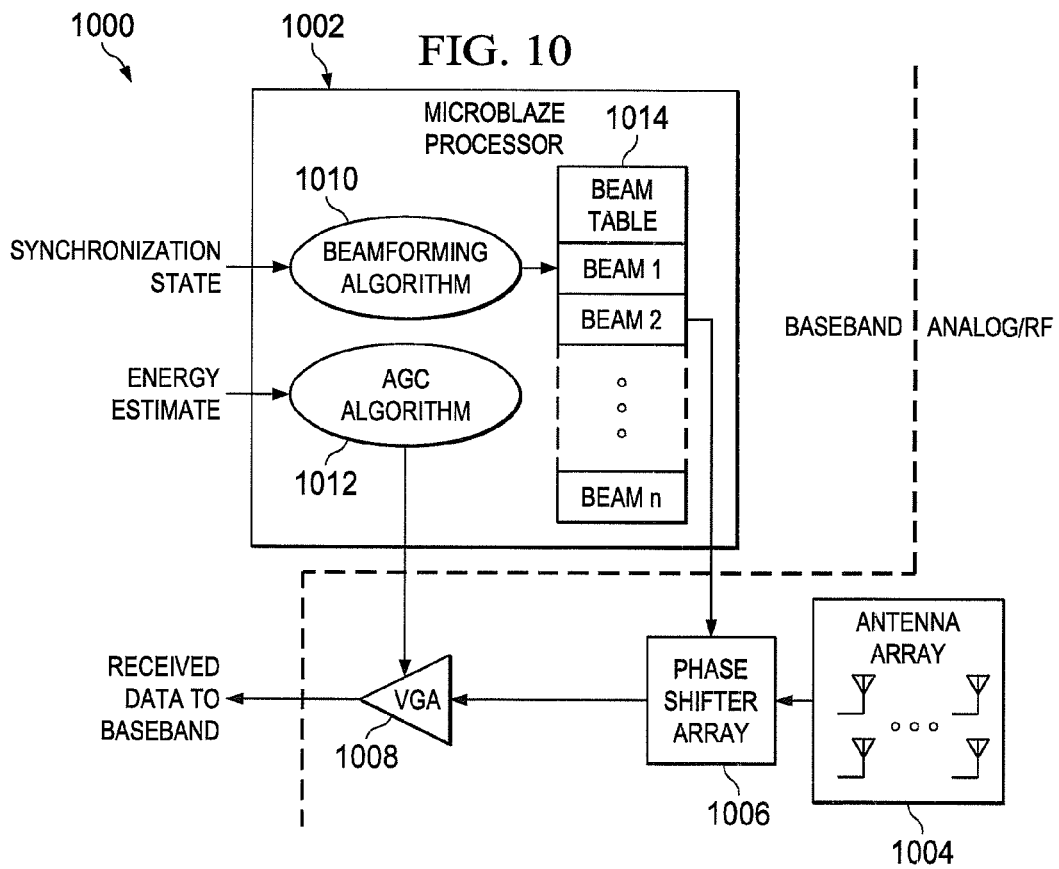
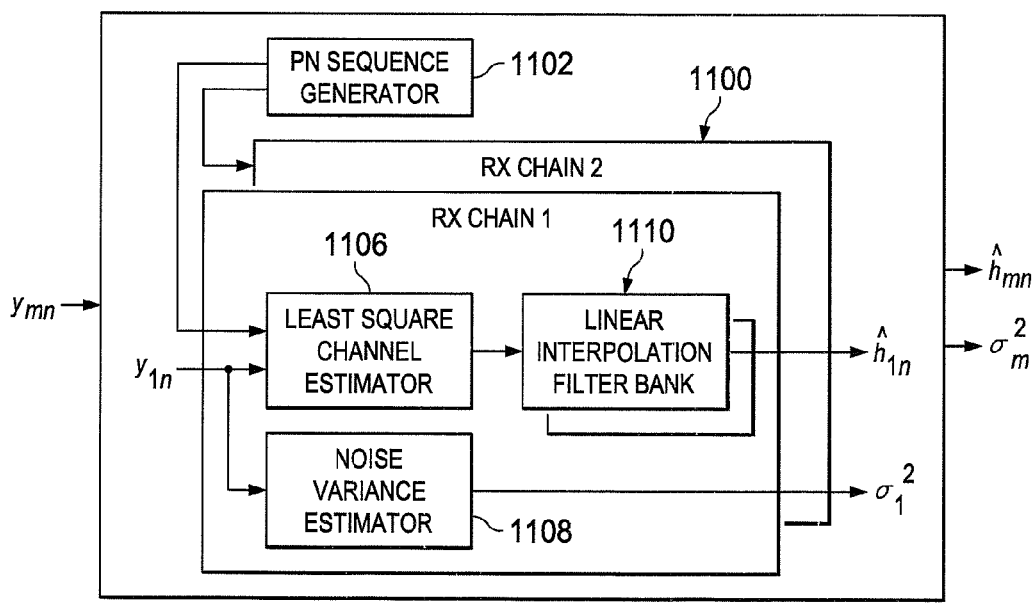

HIGH-THROUGHPUT BEAMFORMING MIMO RECEIVER FOR MILLIMETER WAVE COMMUNICATION AND METHOD

CROSS-REFERENCE TO RELATED APPLICATION(S) AND CLAIM OF PRIORITY

The present application is related to U.S. Provisional Patent Application No. 61/710,477, filed Oct. 5, 2012, titled "HIGH-THROUGHPUT BEAMFORMING MIMO RECEIVER FOR MILLIMETER WAVE COMMUNICATION." Provisional Patent Application No. 61/710,477 is assigned to the assignee of the present application and is hereby incorporated by reference into the present application as if fully set forth herein. The present application hereby claims priority under 35 U.S.C. §119(e) to U.S. Provisional Patent Application No. 61/710,477.

TECHNICAL FIELD

The present application relates generally to wireless communications and, more specifically, to a high-throughput beamforming MIMO receiver for millimeter wave communication and method.

BACKGROUND

The demand for wireless data traffic is explosively increasing due to increasing popularity of smart phones and other mobile data devices, such as tablets, netbooks and eBook readers, among consumers and businesses. In order to meet the high growth in mobile data traffic, the implementation of a mobile communication system having larger capacity, higher throughput, lower latency and better reliability is useful.

SUMMARY

This disclosure provides a high-throughput beamforming MIMO receiver for millimeter wave communication and method.

In one embodiment, a receiver in a communication system is provided. The receives includes a synchronization module and a channel estimator. The synchronization module is configured to identify an end of a cyclic prefix (CP) in a received signal using slope detection by monitoring a detection metric threshold in the received signal. The channel estimator configured to estimate a complex noise variance using guard band subcarriers.

In another embodiment, a method for selecting a beam for communication in a receiver in a communication system. The method includes, for each of a plurality of beams, performing automatic gain control for a specified number of sub-frames to determine a gain corresponding to the beam. The beam having the lowest corresponding gain is selected for communication.

In yet another embodiment, a method for beamforming in a receiver in a communication system is provided. The method includes detecting a strongest beam direction for a wide beam for communicating with a base station. A slice-identifier is sent to the base station identifying the wide beam. A set of narrow beams within the wide beam is scanned. A strongest beam direction is detected for one of the narrow beams for communicating with the base station. A slice-identifier is sent to the base station identifying the narrow beam. Data that is transmitted on the narrow beam is received.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an architecture for beamforming and automatic gain control (AGC) for a receiver in an MMB system according to an embodiment of the disclosure;

FIG. 11 illustrates details of a channel estimation module for a receiver in an MMB system according to an embodiment of the disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Mobile communication has been one of the most successful innovations in modern history. In recent years, the number of subscribers to mobile communication services has exceeded five billion and is growing fast. At the same time, new mobile communication technologies, such as LIE and WiMAX systems, have been developed to satisfy the increasing demand. However, as more and more users utilize mobile communication systems, there is an increasing need for a mobile communication system with larger capacity, higher throughput, and lower latency.

Conventionally, millimeter waves refer to radio waves with frequency of 3 GHz-300 GHz. These bands exhibit unique propagation characteristics. For example, compared with lower frequency bands, they suffer higher propagation loss, have poorer ability to penetrate objects, and are more susceptible to atmospheric absorption, deflection and diffraction due to particles (e.g., rain drops) in the air. On the other hand, due to their smaller wave lengths, more antennas can be packed into a relatively small area. In addition, because these bands have been less utilized than the lower frequency bands, they have less existing interference and lower spectrum cost.

Although the 60-GHz band can provide very high data rates, up to 10 Gbps within 1 meter and 3 Gbps within 10 meters, the high atmospheric absorption limits the usage of 60 GHz for outdoor mobile communication. However, choosing a lower unused band at 28 GHz, it is possible to achieve Gbps data rates in an urban mobile environment. The 28-GHz band exhibits better propagation characteristics compared to 60-GHz and higher bands, and it has similar free space path loss to the widely used cellular bands. These facts enable millimeter-wave communication to be a strong candidate for the next generation mobile communication (5G).

With regard to the following description, it is noted that the LTE terms "node B," "enhanced node B," and "eNodeB" are other terms for "base station" used below. A base station as described herein may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel. In addition, the LTE term "user equipment" or "UE" is another term for "subscriber station" used below, and a "mobile station" as described herein is interchangeable with a "subscriber station."

Figure 1:
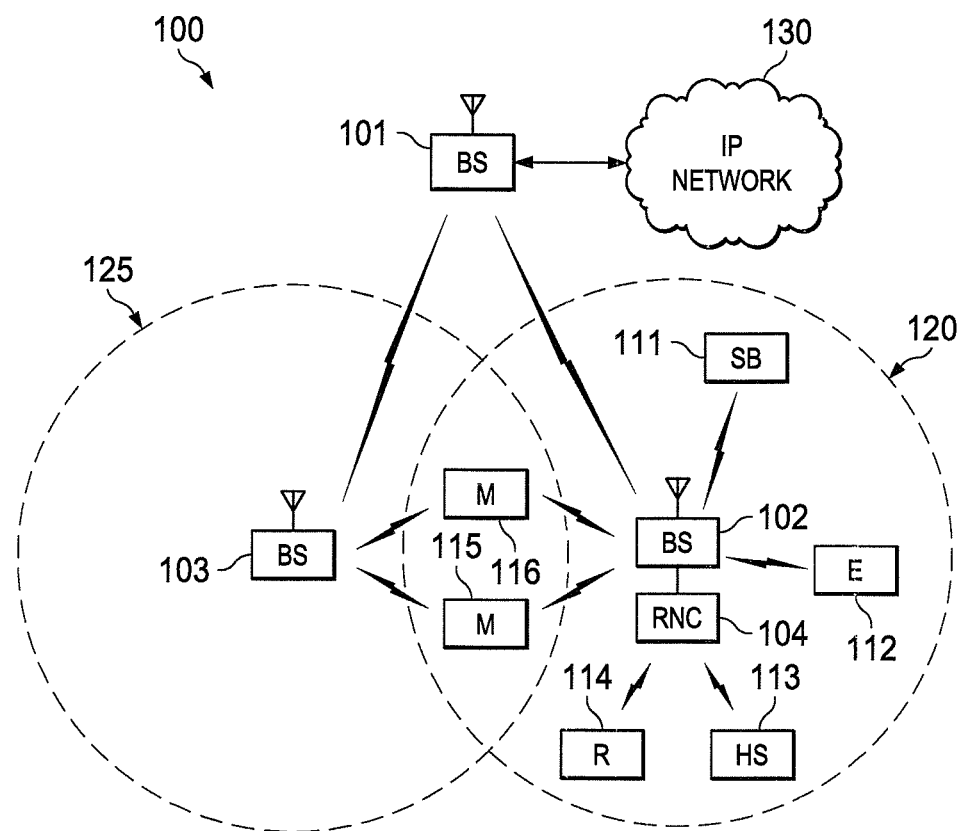
FIG. 1 illustrates a wireless network according to an embodiment of the disclosure.

FIG. 1 illustrates an exemplary wireless network 100 according to one embodiment of the present disclosure. In the illustrated embodiment, the wireless network 100 includes base station (BS) 101, base station 102, and base station 103. Base station 101 communicates with base station 102 and base station 103. Base station 101 also communicates with Internet protocol (IP) network 130, such as the Internet, a proprietary IP network, or other data network. Base station 102 communicates with a Radio Network Controller (RNC) 104. In certain embodiments, the RNC 104 may be a part of base station 102. In certain embodiments, base station 101 and base station 103 may also communicate with the RNC 104. In other embodiments, base station 101 and base station 103 may include, or be in communication with, another radio network controller similar to the RNC 104. Base station 102 or base station 103 may communicate with IP network 130 using wireline, instead of communicating with base station 101 wirelessly.

Base station 102, either in cooperation with the RNC 104 or through the RNC 104, provides wireless broadband access to the network 130 to a first plurality of subscriber stations within a coverage area 120 of base station 102. The first plurality of subscriber stations includes subscriber station (SS) 111, subscriber station 112, subscriber station 113, subscriber station 114, subscriber station 115 and subscriber station 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to the network 130, via base station 101, to a second plurality of subscriber stations within a coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that the wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Although FIG. 1 depicts one example of a wireless network 100, various changes may be made to FIG. 1. For example, another type of data network, such as a wired network, may be substituted for the wireless network 100. In a wired network, network terminals may replace BS's 101-103 and SS's 111-116. Wired connections may replace the wireless connections depicted in FIG. 1.

Figure 2:
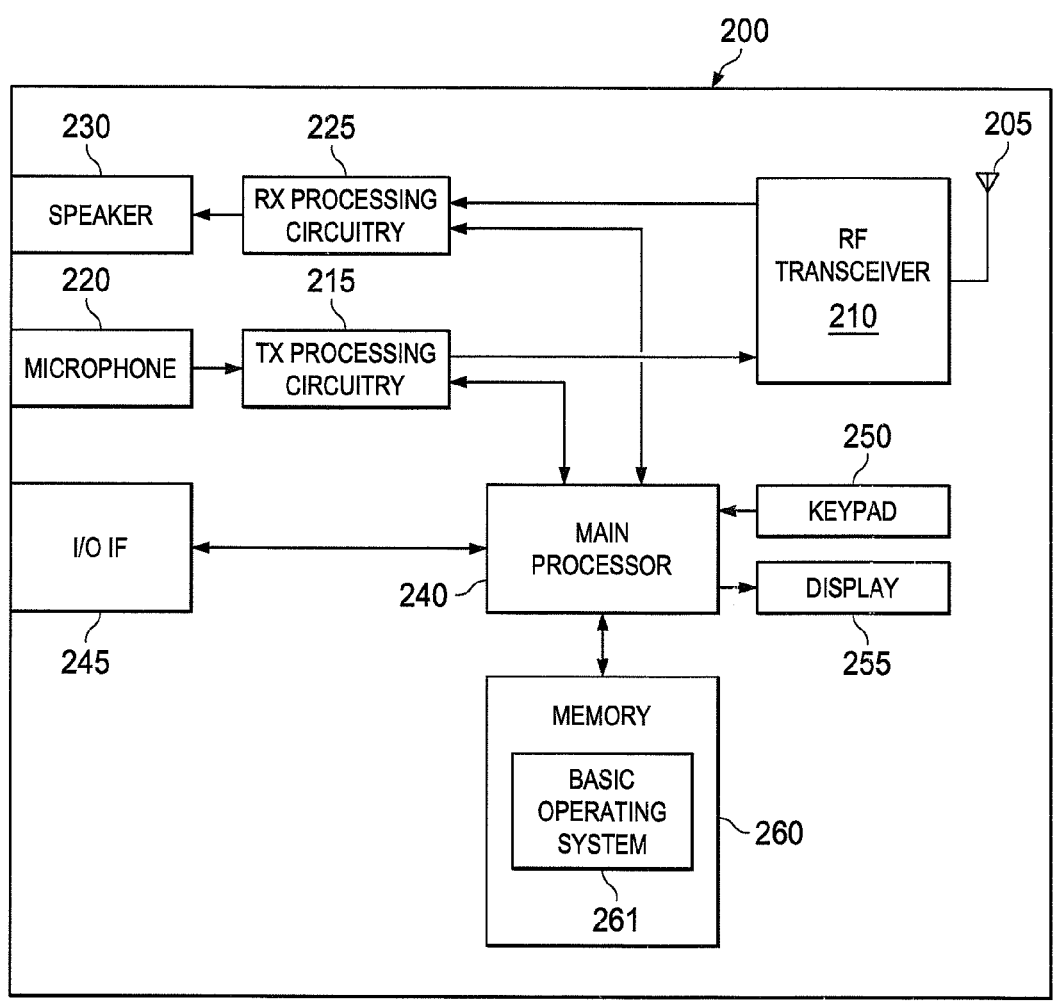
FIG. 2 illustrates a wireless mobile station according to an embodiment of the disclosure.

FIG. 2 illustrates a wireless mobile station 200 according to embodiments of the present disclosure. In certain embodiments, the wireless mobile station 200 may represent any of the subscriber stations 111-116 shown in FIG. 1. The embodiment of the wireless mobile station 200 illustrated in FIG. 2 is for illustration only. Other embodiments of the wireless mobile station 200 could be used without departing from the scope of this disclosure.

The wireless mobile station 200 comprises an antenna 205, a radio frequency (RF) transceiver 210, transmit (TX) processing circuitry 215, a microphone 220, receive (RX) processing circuitry 225 and a speaker 230. The mobile station 200 also comprises a main processor 240, an input/output (I/O) interface (IF) 245, a keypad 250, a display 255 and a memory 260.

The RF transceiver 210 receives from the antenna 205 an incoming RF signal transmitted by a base station of the wireless network 100. The RF transceiver 210 down-converts the incoming RF signal to produce an intermediate frequency (IF) or a baseband signal. The IF or baseband signal is sent to the RX processing circuitry 225 that produces a processed baseband signal by filtering, decoding and/or digitizing the baseband or IF signal. The RX processing circuitry 225 transmits the processed baseband signal to the speaker 230 (i.e., voice data) or to the main processor 240 for further processing (e.g., web browsing).

The TX processing circuitry 215 receives analog or digital voice data from the microphone 220 or other outgoing baseband data (e.g., web data, e-mail, interactive video game data) from the main processor 240. The TX processing circuitry 215 encodes, multiplexes and/or digitizes the outgoing baseband data to produce a processed baseband or IF signal. The RF transceiver 210 receives the outgoing processed baseband or IF signal from the TX processing circuitry 215. The RF transceiver 210 up-converts the baseband or IF signal to a RF signal that is transmitted via the antenna 205.

In some embodiments of the present disclosure, the main processor 240 is a microprocessor or microcontroller. The memory 260 is coupled to the main processor 240. The memory 260 can be any computer-readable medium. For example, the memory 260 can be any electronic, magnetic, electromagnetic, optical, electro-optical, electro-mechanical and/or other physical device that can contain, store, communicate, propagate, or transmit a computer program, software, firmware, or data for use by the microprocessor or other computer-related system or method. According to such embodiments, part of the memory 260 comprises a random access memory (RAM) and another part of the memory 260 comprises a Flash memory, which acts as a read-only memory (ROM).

The main processor 240 executes a basic operating system program 261 stored in the memory 260 in order to control the overall operation of the mobile station 200. In one such operation, the main processor 240 controls the reception of forward channel signals and the transmission of reverse channel signals by the RF transceiver 210, the RX processing circuitry 225, and the TX processing circuitry 215, in accordance with well-known principles.

The main processor 240 is capable of executing other processes and programs resident in the memory 260. The main processor 240 can move data into or out of the memory 260, as required by an executing process. The main processor 240 can move data into or out of the memory 260, as required by an executing process. The main processor 240 is also coupled to the I/O interface 245. The I/O interface 245 provides the mobile station 200 with the ability to connect to other devices such as laptop computers and handheld computers. The I/O interface 245 is the communication path between these accessories and the main controller 240.

The main processor 240 is also coupled to the keypad 250 and the display unit 255. The operator of the mobile station 200 uses the keypad 250 to enter data into the mobile station 200. The display 255 may be a liquid crystal or light emitting diode (LED) display capable of rendering text and/or graphics from web sites. Alternate embodiments may use other types of displays. For example, for an embodiment in which the display 255 is a touch-screen display, the keypad 250 may be provided via the display 255.

Although FIG. 2 depicts one example of a mobile station 200, various changes may be made to FIG. 2. For example, a wired or wireless network terminal may be substituted for the mobile device 200. A wired network terminal may or may not include components for wireless communication, such as an antenna.

Figure 3:
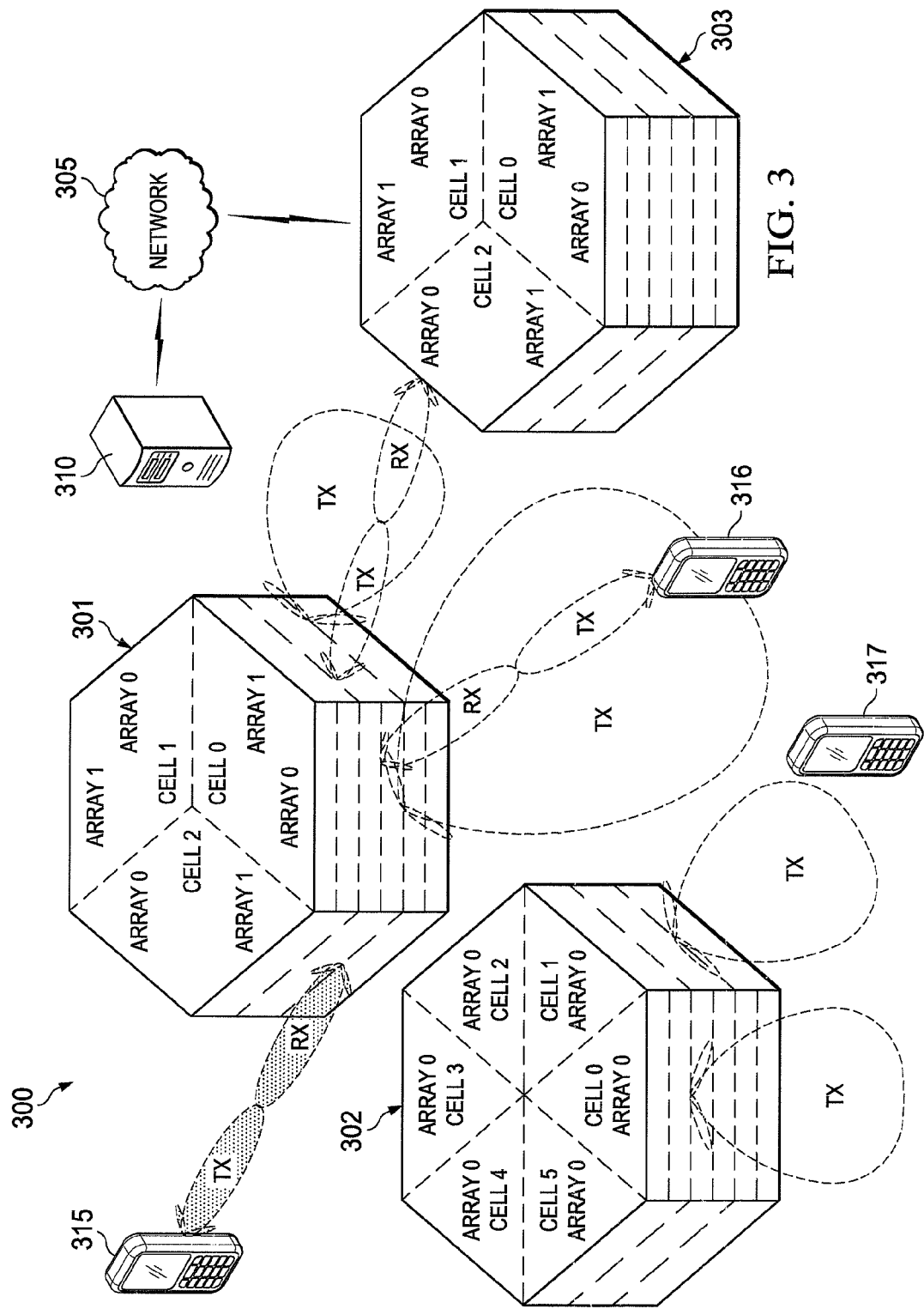
FIG. 3 illustrates a millimeter-wave mobile broadband (MMB) communication system according to an embodiment of the disclosure.

FIG. 3 illustrates a millimeter-wave mobile broadband (MMB) communication system 300 according to an embodiment of the disclosure. In the illustrated embodiment, the system 300 includes base station 301, base station 302, and base station 303.

Base station 301 is configured to communicate with base station 303 and with mobile stations 315 and 316. Base station 302 is configured to communicate with mobile station 317. Base station 303 is configured to communicate with a network 305, which provides access to a packet data server gateway 310. Both base station 301 and base station 303 comprise three cells (cell 0, cell 1 and cell 2), with each cell comprising two arrays (array 0 and array 1). Base station 302 comprises six cells (cell 0, cell 1, cell 2, cell 3, cell 4 and cell 5), with each cell comprising one array (array 0).

It will be understood that this embodiment is for illustration only and that other embodiments of the system 300 could be implemented without departing from the scope of this disclosure. For example, the base stations 301-303 may each communicate with any other suitable base station and/or mobile station. In addition, it will be understood that the base stations 301-303 may each represent any of the base stations 101-103 shown in FIG. 1 and that the mobile stations 315-317 may each represent any of the subscriber stations 111-116 shown in FIG. 1 and/or the mobile station 200 shown in FIG. 2.

The embodiments in this disclosure can be also applied to base station-to-base station wireless communication and mobile station-to-mobile station wireless communication, and are not limited to the communications between base station and mobile station. Throughout this disclosure, the beams (including TX beams and RX beams) can have various beamwidths or various shapes, including regular or irregular shapes, and are not limited by those shown in the figures.

Furthermore, although the system 300 is described in the context of communication with millimeter waves, the system 300 may be implemented using any other suitable communication medium, such as radio waves with frequencies of 3 GHz-30 GHz that exhibit properties similar to millimeter waves. In addition, the communication medium may comprise electromagnetic waves with terahertz frequencies or infrared light, visible light or other optical media.

As used herein, the term "cellular band" refers to frequencies around a few hundred megahertz to a few gigahertz and the term "millimeter-wave band" refers to frequencies around a few gigahertz to a few hundred gigahertz. The radio waves in cellular bands may have less propagation loss and provide better coverage but may also use relatively large antennas. On the other hand, radio waves in millimeter-wave bands may suffer higher propagation loss but lend themselves well to high-gain antenna or antenna array design in a small form factor.

A vast amount of spectrum is available in the millimeter-wave band. Millimeter-wave band has been used, for example, in short range (within 10 meters) communications. However, the existing technologies in millimeter-wave band are not for commercial mobile communication in a wider coverage, so no commercial cellular system in millimeter-wave band currently exists. For the description below, mobile broadband communication systems deployed in 3 GHz-300 GHz frequencies are referred to as millimeter-wave mobile broadband (MMB) communication systems.

One system design approach is to leverage the existing technologies for mobile communication and utilize the millimeter-wave channel as additional spectrum for data communication. In this type of system, communication stations, including different types of mobile stations, base stations, and relay stations, communicate using both the cellular bands and the millimeter-wave bands. The cellular bands are typically in the frequency of a few hundred megahertz to a few gigahertz. Compared with millimeter waves, the radio waves in these frequencies suffer less propagation loss, can better penetrate obstacles, and are less sensitive to non-line-of-sight (NLOS) communication links or other impairments, such as absorption by oxygen, rain, and other particles in the air. Therefore, certain control channel signals may be transmitted via these cellular radio frequencies, while the millimeter waves may be utilized for high data rate communication.

Another system design approach is to have standalone mobile communications and control/data communications in the MMB system 300. A mobile station 315-317 can handover to an existing cellular system such as 4G, 3G, etc., in situations such as when the mobile station 315-317 is in a coverage hole in the MMB system 300 or the signal strength from the base stations 301-303 in the MMB system 300 is not strong enough.

In any case, the communications in the MMB system 300 will coexist with the current cellular systems such as 4G, 3G, etc. In addition, base stations 301-303 in the MMB system 300 can have different sizes, with overlay hierarchical network structure, where small cells can be overlaid by large cells.

For some embodiments, a base station 301-303 can have one or multiple cells, and each cell can have one or multiple antenna arrays. Also, each array within a cell can have an array-specific frame structure. For example, the arrays may have different uplink and downlink ratios in a time division duplex (TDD) system. This provides flexibility for wireless backhaul.

Multiple transmitting/receiving (TX/RX) chains can be applied in one array, in one cell, etc. One or multiple antenna arrays in a cell can have the same downlink control channel (e.g., synchronization channel, physical broadcast channel and/or the like) transmission, while the other channels, such as data channels or the like, can be transmitted in a frame structure that is specific to each antenna array.

Base stations 301-303 and mobile stations 315-317 can each use antennas or antenna arrays to carry out beamforming. Antenna arrays can form beams with different widths, such as wide beam or narrow beam. Downlink control channels, broadcast signals/messages and/or broadcast data or control channels can be transmitted in wide beams. A wide beam may be provided by transmitting one wide beam at one time, a sweep of narrow beams at one time or at sequential times, or in any other suitable manner. Multicast and/or unicast data/control signals or messages can be sent in narrow beams.

Also, for some embodiments, the widths of the beams for each mobile station 315-317 may be determined based on the speed of the mobile station 315-317. For example, low-mobility mobile stations may use a narrower beam, while high-mobility mobile stations may use a wider beam or multiple narrow beams.

For some embodiments, identifiers of cells may be carried in the synchronization channel, and identifiers of arrays, beams and the like may be implicitly or explicitly carried in the downlink control channels. The identifiers may be transmitted using wide beams. By acquiring these channels, a mobile station 315-317 can detect the identifiers.

For the embodiment illustrated in FIG. 3, each of the antenna arrays (array 0 and array 1) in cell 0 of base station 301 transmits the same downlink control channels on a wide beam. However, array 0 can have a different frame structure from array 1. For example, array 0 can have uplink unicast communication with mobile station 316, while array 1 can have a downlink backhaul communication with array 0 in cell 2 of base station 303, which may have a wired backhaul connecting to the backhaul networks.

Although FIG. 3 illustrates one example of an MMB communication system 300, various changes may be made to FIG. 3. For example, the makeup and arrangement of the system 300 are for illustration only. Components could be added, omitted, combined, subdivided, or placed in any other suitable configuration according to particular needs.

Figure 4:
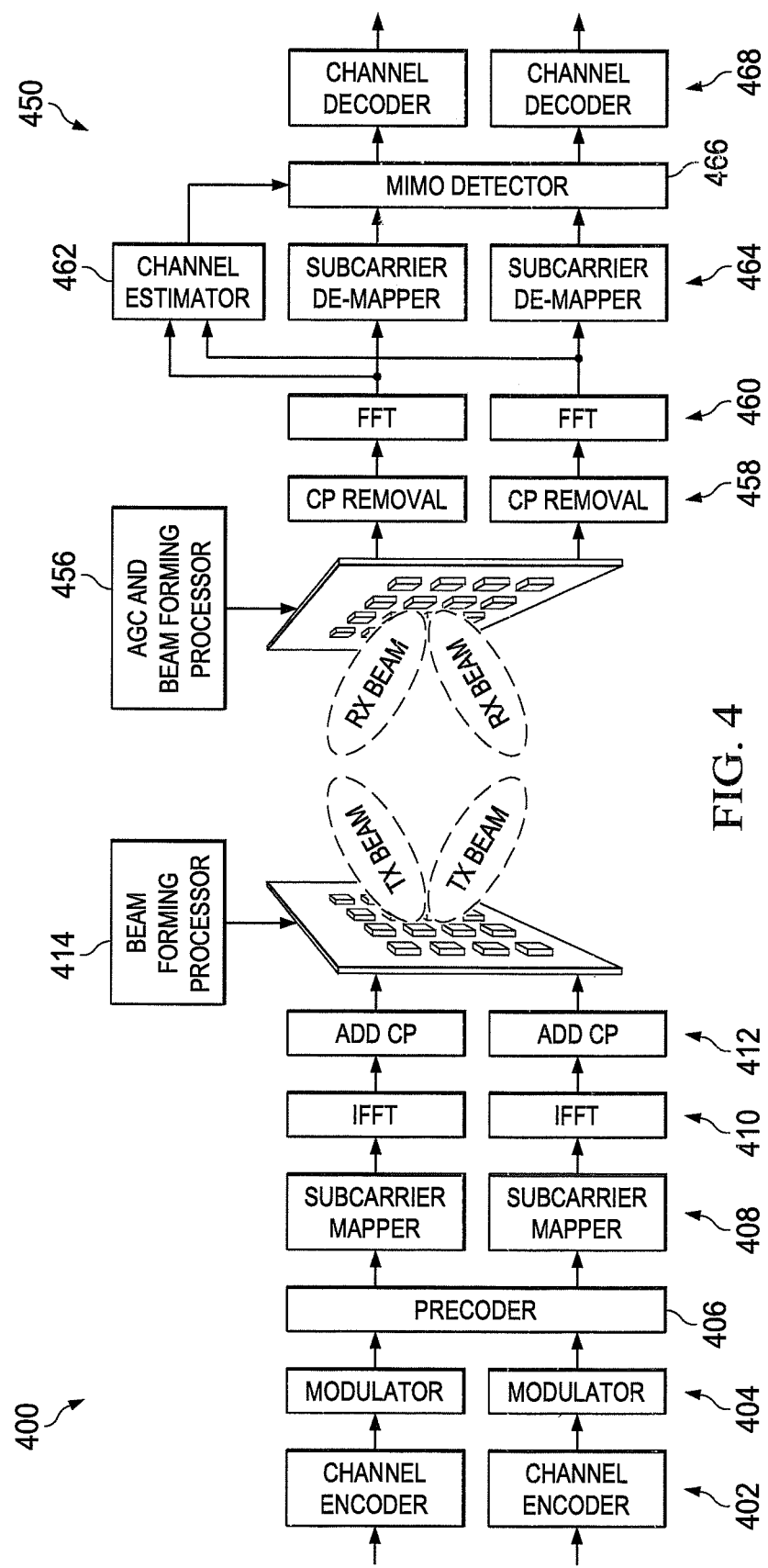
FIG. 4 illustrates details of a transmitter and a receiver in an MMB MIMO OFDM system according to an embodiment of the disclosure.

FIG. 4 illustrates details of a transmitter 400, such as a base station, and a receiver 450, such as a mobile station, in an MMB MIMO OFDM system according to an embodiment of the disclosure. The transmitter 400 and receiver 450 shown in FIG. 4 are for illustration only. A transmitter and receiver may be configured in any other suitable manner without departing from the scope of this disclosure.

To overcome the unfavorable propagation characteristics of millimeter waves and to achieve much higher energy efficiency (energy per bit delivered over the air), transmitters and receivers operating in a millimeter-wave mobile broadband communication system, such as the illustrated transmitter 400 and receiver 450, use beamforming in their communication.

For the illustrated embodiment, the transmitter 400 and receiver 450 are provided in a MIMO OFDM system with $N_T$ baseband transmitter chains and $N_R$ baseband receiver chains. Each baseband stream is converted up to the carrier frequency and split onto k RF chains (e.g., phase-shifter, power amplifier, and antenna). The information bits are first encoded with a low density parity check (LDPC) channel code at channel encoders 402. Then the coded bits are modulated with a Q-ary modulation in modulators 404. After modulation, the data sequence is processed with a MIMO precoder 406 to generate $N_T$ data streams. Then each data stream is mapped by subcarrier mappers 408 onto the subcarriers of the OFDM symbol. Then an IFFT 410 transforms the OFDM symbol from a subcarrier mapper 408 into the time domain. For some embodiments, the IFFT 410 may be a 2048-point IFFT. A cyclic prefix (CP) adder 412 then adds a CP to the beginning of the time domain OFDM symbol. After this, the output goes through digital-to-analog converter (DAC) (not shown in FIG. 4) to the RF unit. Then each data stream is fed to k RF chains. In total, there are $kN_T$ RF chains to transmit $N_T$ streams. The phase shifters of these RF chains are controlled by a beamforming processor 414 at baseband to form analog beams. This process is called analog beamforming. By using analog beamforming, the number of required DACs is greatly reduced, which lowers the power consumption and cost.

At the receiver 450, analog beamforming with $kN_R$ RF chains is used to adjust the direction of the receiver analog beam. CP removers 458 remove the CP from the received signal. Then an FFT 460 at each receiver baseband chain transforms the data into the frequency domain. For some embodiments, the FFT 460 may be a 2048-point FFT. The equivalent system in the frequency domain for subcarrier j is as follows:

$$Y_j = B_j^{RX} H_j B_j^{TX} X_j + N_j = H_j^{Lump} X_j + N_j.$$

where $Y_j$ is an $N_R \times 1$ vector of the received baseband data; $B^{RX}_j$ is an $N_R \times kN_R$ matrix corresponding to the receiver analog beamforming at subcarrier j; $H_j$ is a $kN_R \times kN_T$ channel response matrix of subcarrier j; $B^{TX}_j$ is an $kN_T \times N_T$ matrix corresponding to the transmitter analog beamforming at subcarrier j; $X_j$ is an $N_T \times 1$ vector of the transmitted baseband data; $N_j$ is an $N_R \times 1$ vector of complex additive white Gaussian noise with zero mean and variance $\sigma^2_N$. The $B^{RX}_j H_j B^{TX}_j$ can be lumped together to be represented by an $N_R \times N_T$ equivalent channel matrix $H^{Lump}_j$ for subcarrier j. With the aid of pilots, this lumped channel is estimated at the channel estimator 462 as $\hat{H}^{Lump}_j$. The MIMO detector 466 uses this estimated channel and the corresponding demapped received data $Y_j$ from subcarrier demappers 464 to compute the soft information as log-likelihood ratio (LLR) values. Then the LDPC channel decoder 468 decodes the information bits from the LLR values.

Figure 5A:
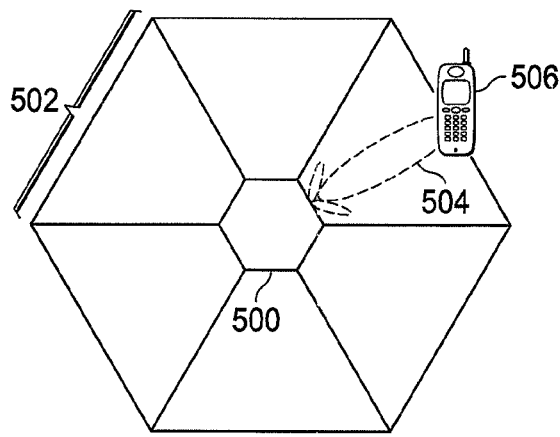
FIG. 5A illustrates sectors of a base station in an MMB communication system according to an embodiment of the disclosure.

FIG. 5A illustrates sectors 502 of a base station 500 in an MMB communication system according to an embodiment of the disclosure. For the illustrated embodiment, the base station 500 serves six sectors 502, with each sector covering an area of about 60°. However, it will be understood that the base station 500 may serve any suitable number of sectors 502 and each sector 502 may cover any suitable coverage area without departing from the scope of the disclosure.

The base station 500 in this illustration is transmitting a narrow steered beam 504 within one of the sectors 502 that is directed toward a mobile station 506. The mobile station 506 may comprise a patch antenna array for receiving the narrow steered beam 504.

Figure 5B:
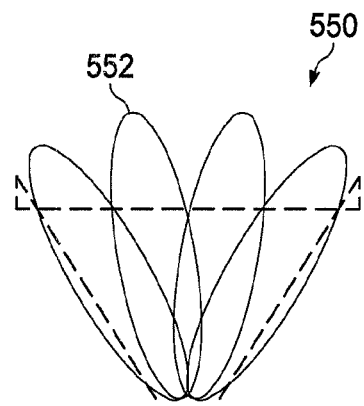
FIG. 5B illustrates one of the sectors of FIG. 5A according to an embodiment of the disclosure.

FIG. 5B illustrates one of the sectors 502 according to an embodiment of the disclosure. Each sector 502 is divided into q sub-sectors, called slices 552. While the illustrated embodiment shows the sector 502 divided into four slices 552, it will be understood that the sector 502 may be divided into any suitable number of slices 552. Each slice 552 corresponds to a beam and is outlined by a synchronization channel (SCH) and a broadcast channel (BCH), which may be transmitted using a wide beam. Similarly, the mobile station also has multiple slices.

For some embodiments, the base station 500 may send a synchronization signal and training pilots periodically in each base station slice to allow the mobile station 506 to synchronize to the frame timer and to scan for the best slice pair, which maximizes the received signal power. After slice pairing, data transmission can begin using the slice beams 552. On the other hand, as described in more detail below, a synchronization algorithm can further narrow the transmitter and receiver beams within the paired slice and then transmit data with narrower beams for better channel quality. Data may then be transmitted on the narrower slice beams 552.

Figure 6:
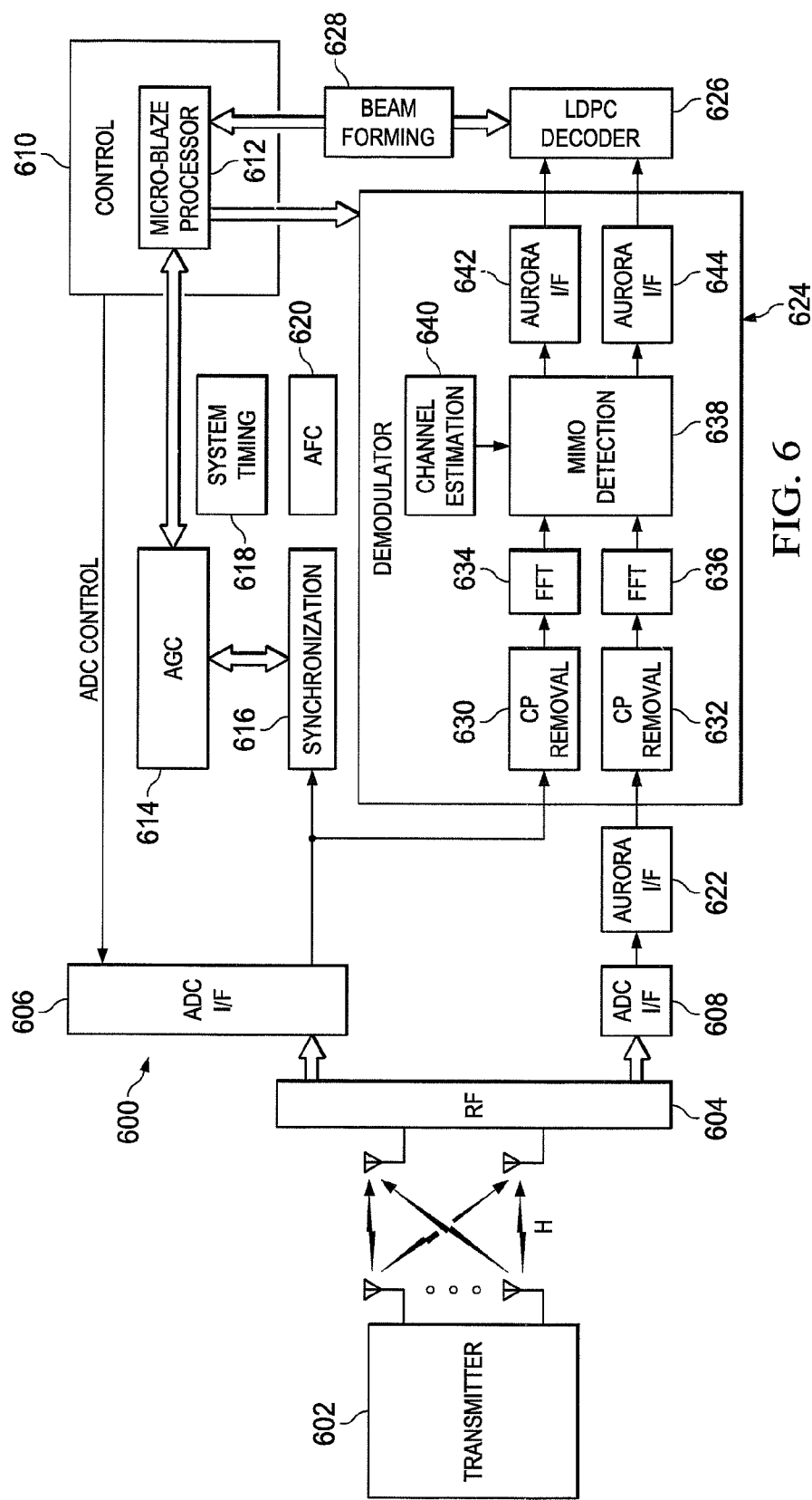
FIG. 6 illustrates details of a receiver in an MMB system according to an embodiment of the disclosure.

FIG. 6 illustrates details of a receiver 600, such as a mobile station, in an MMB system according to an embodiment of the disclosure. The receiver 600 shown in FIG. 6 is for illustration only. A receiver may be configured in any other suitable manner without departing from the scope of this disclosure.

The receiver 600 is configured to receive data transmitted from a transmitter 602, such as a base station. The receiver 600 comprises a radiofrequency (RF) module 604, analog-to-digital converter (ADC) interfaces (I/F) 606 and 608, a controller 610, which comprises a Microblaze processor 612, an automatic gain control (AGC) module 614, a synchronization module 616, a system timing module 618, an adaptive feedback cancelling (AFC) module 620, an Aurora interface 622, a demodulator 624, an LDPC decoder 626 and a beamforming module 628. The demodulator 624 comprises CP removal modules 630 and 632, FFT modules 634 and 636, a MIMO detection module 638, a channel estimation module 640 and Aurora interfaces 642 and 644.

For some embodiments, the receiver 600 may be configured to operate at a 28-GHz carrier frequency with 500 MHz bandwidth and to run up to 1.52 Gbps on a BEECube multi-FPGA system using the soft MAP detector for the MIMO detection module 638. For a particular embodiment, the FFT modules 634 and 636 may each comprise an FFT block from the Xilinx IP library. This block can support up to a 2048-point complex FFT. To achieve a high data rate, the pipelined streaming mode at 450 MHz may be used.

For a particular embodiment, the LDPC channel decoder 626 may be configured to use a channel code that is a rate-13/16 672-bit, Quasi-Cyclic LDPC code, which is adopted in the IEEE 802.11ad standard. The layered decoding algorithm may be used to reduce the amount of memory. To achieve high throughput with low complexity, the decoder 626 may also be implemented with 8-bit LLR precision. For some embodiments, the maximum clock frequency in the decoder 626 may be 28.8 MHz, and 1.61 Gbps throughput may be achieved by using two LDPC decoders 626 in parallel.

In order to maximize the integrated system throughput, the system may be partitioned into a few clock domains to maximize the throughput of each module separately. For example, for some embodiments, the FFT modules 634 and 636 can run at 450 MHz, the MIMO detection module 638 can run at 380 MHz, the channel estimation module 640 can run at 190 MHz, the synchronization module 616 can run at 69 MHz, the Microblaze processor 612 can run at 150 MHz, and the LDPC decoder 626 can run at 28.8 MHz.

To enable fast data transfer between the different clock domains, a double buffering technique may be used between modules. The receiver 600 may be partitioned onto two field-programmable gate arrays (FPGAs): one for two LDPC decoders 626 and the other for the remaining modules. For this embodiment, the data may be transferred between the FPGAs through 6.6 Gbps GTX transceivers. The overall throughput of the receiver 600 may reach at least 1.52 Gbps for uncoded data. With the rate-13/16 LDPC code, this corresponds to 1.235 Gbps information bit rate.

Although FIG. 6 illustrates one example of a receiver 600 in an MMB communication system, various changes may be made to FIG. 6. For example, the makeup and arrangement of the receiver 600 are for illustration only. Components could be added, omitted, combined, subdivided, or placed in any other suitable configuration according to particular needs.

Figure 7:
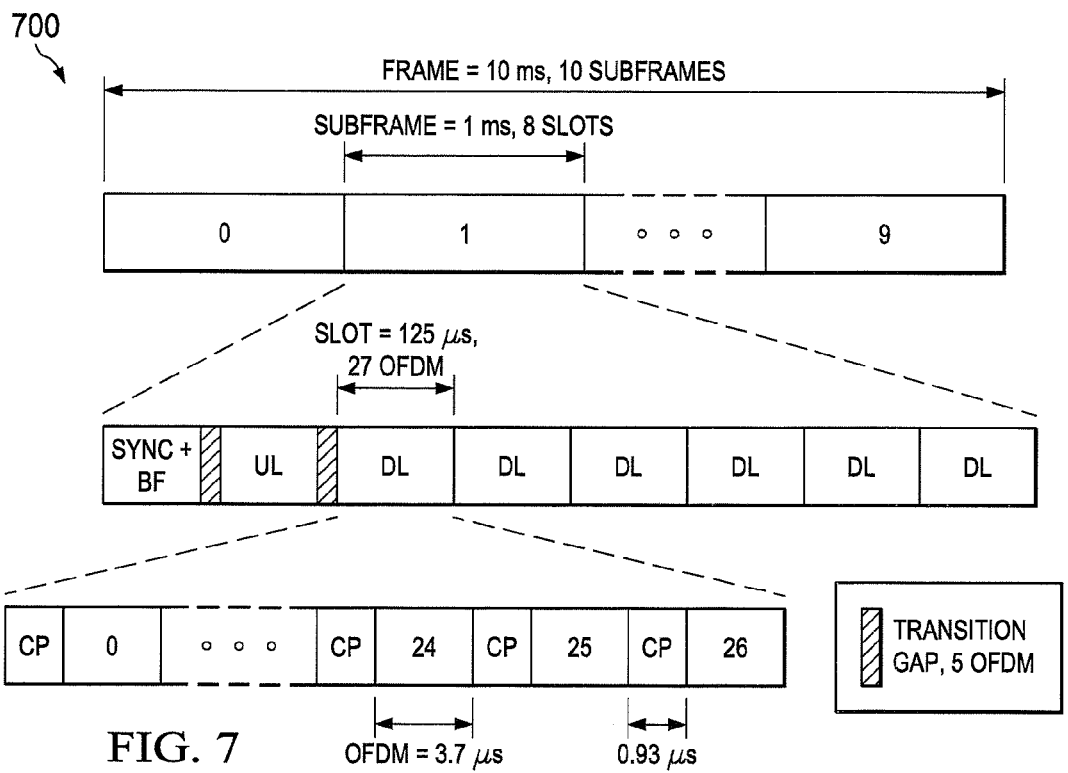
FIG. 7 illustrates a synchronization channel between a base station and a mobile station in an MMB communication system according to an embodiment of the disclosure.

FIG. 7 illustrates a synchronization channel 700 between a base station and a mobile station in an MMB communication system according to an embodiment of the disclosure. The synchronization channel 700 shown in FIG. 7 is for illustration only. A synchronization channel may be configured in any other suitable manner without departing from the scope of this disclosure.

For this embodiment, a 10-ms frame is divided into ten sub-frames, with each sub-frame comprising 1 ms that includes eight slots. Each slot comprises 125 μs and 27 OFDM symbols. Synchronization, beamforming and AGC training are provided in the first slot of a sub-frame, followed by a transition gap, an uplink slot, another transition gap, and six downlink slots. MIMO feedback may be provided in the uplink slot.

Figure 8:
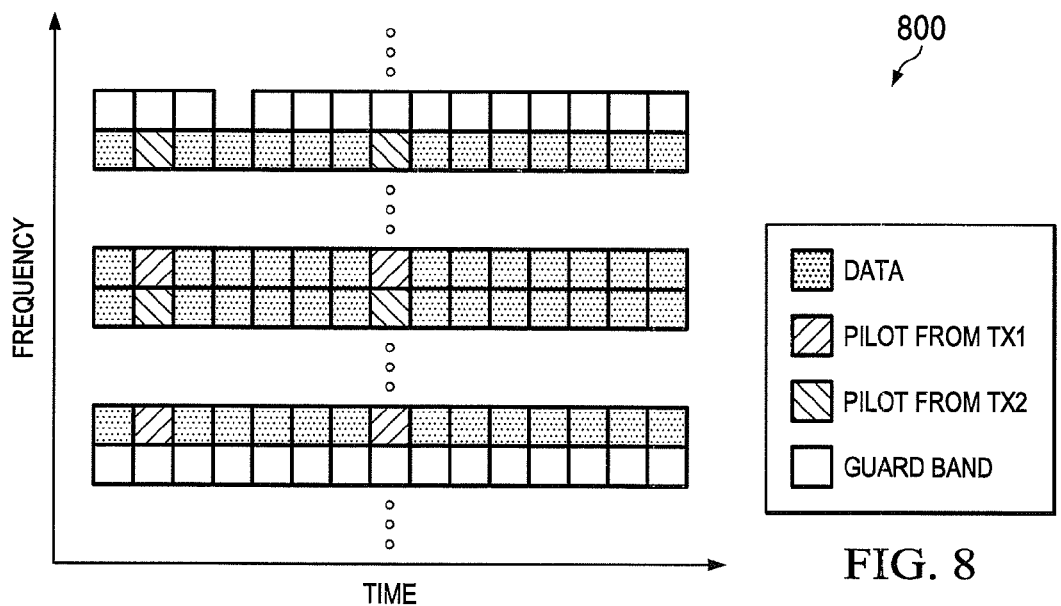
FIG. 8 illustrates allocation of data and pilot signals in an MMB communication system according to an embodiment of the disclosure.

FIG. 8 illustrates allocation 800 of data and pilot signals in an MMB communication system according to an embodiment of the disclosure. The allocation 800 shown in FIG. 8 is for illustration only. Data and pilot signals may be allocated in any other suitable manner without departing from the scope of this disclosure.

After the transmitter beams and the receiver beams are paired, pilots are sent out to estimate the MIMO channels. As illustrated in FIG. 8, in the transmitter, pilots from each transmitter chain are first interleaved in the frequency domain, and are then inserted into the data stream at specific subcarriers every six cycles. Although this scheme uses more bandwidth, it can achieve more stable channel estimation.

Figure 9:
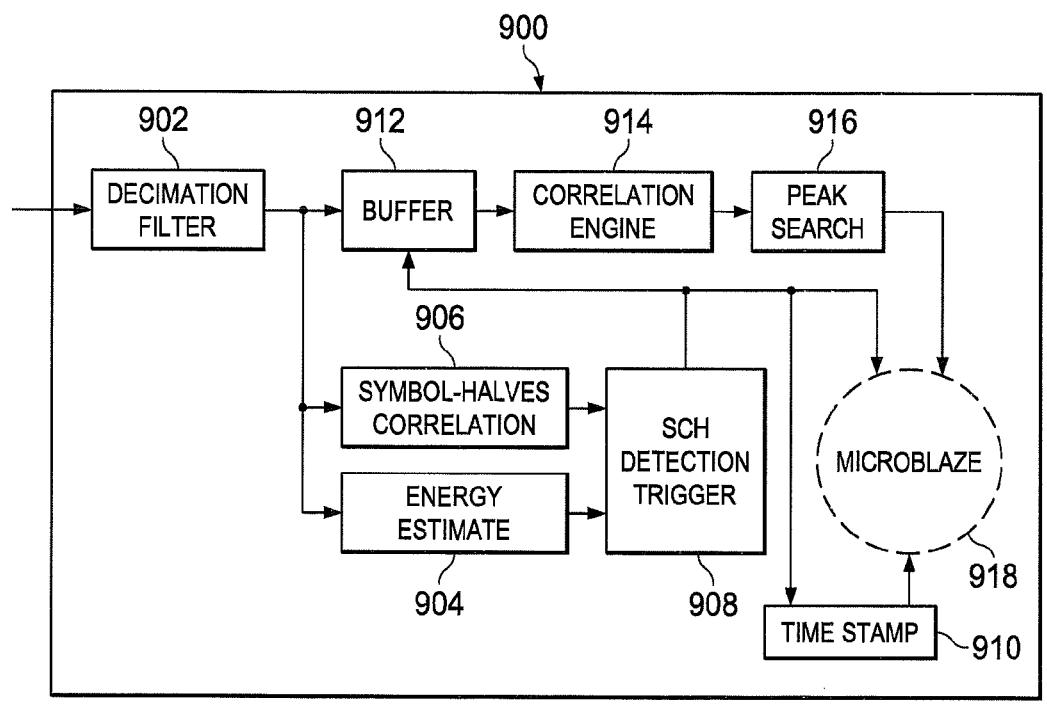
FIG. 9 illustrates details of a synchronization module for a receiver in an MMB system according to an embodiment of the disclosure.

FIG. 9 illustrates details of a synchronization module 900 for a receiver in an MMB system according to an embodiment of the disclosure. The synchronization module 900 shown in FIG. 9 is for illustration only. A synchronization module may be configured in any other suitable manner without departing from the scope of this disclosure. For some embodiments, the synchronization module 900 may correspond to the synchronization module 616 of the receiver 600 shown in FIG. 6.

For the illustrated embodiment, the synchronization module 900 comprises a decimation filter 902, an energy estimator 904, a symbol-halves correlator 906, a synchronization channel (SCH) detection trigger 908, a time stamper 910, a buffer 912, a correlation engine 914 and a peak searcher 916. The SCH detection trigger 908, the time stamper 910, and the peak searcher 916 are coupled to a Microblaze processor 918, such as the Microblaze processor 612 of the receiver 600 shown in FIG. 6.

For this embodiment, the SCH detection trigger 908 is configured to use slope detection to identify the end of the cyclic prefix (CP). Thus, the SCH detection trigger 908 is configured to monitor a detection metric threshold. This detection metric threshold comprises a signal that remains high, i.e., above a specified threshold, for a length equal to the length of the CP. Therefore, the SCH detection trigger 908 is configured to compare two values of the metric threshold (an earlier value and a later value) separated in time by the length of the CP. When the later value becomes lower than the earlier value, the SCH detection trigger 908 is configured to identify the end of the CP.

Based on the identification of the end of the CP, the SCH detection trigger 908 is configured to signal the time stamper 910, the buffer 912, and the Microblaze processor 918 that synchronization has occurred so that transmitter and receiver beam slices for communication may be identified, as described in more detail below. In addition, when the synchronization module 900 detects synchronization, the synchronization module 900 is configured to capture an energy value generated by the energy estimator 904 for use in beamforming and AGC, as described in more detail below in connection with FIG. 10.

Thus, the synchronization module 900 is responsible for slice identification, timing, and frequency synchronization by detecting and processing the sequences in the SCH, which may be designed to occupy about ⅛ of the system bandwidth and may be centered around the carrier frequency. The location and the structure of the SCH in the frame may be as shown in FIG. 7, above. For this embodiment, the base station transmits the synchronization signal on SCH in the first slot of every sub-frame. Inside that slot, one SCH OFDM symbol is transmitted for each slice. The SCH OFDM symbol also carries information about the slice-ID. For example, if there are four slices, SCH spans four OFDM symbols with $Z_1$, $Z_2$, $Z_3$, and $Z_4$, which corresponds to each transmitter slice, respectively. However, because the receiver is not aligned with the transmitter OFDM symbol timing before acquiring a synchronization signal, it is possible for the receiver to start detecting the SCH OFDM symbols at the i-th transmitter slice Z. Also, because the mobile station changes the receiver slice every sub-frame (1 ms), the mobile station would be unable to detect the synchronization signal. To solve this problem, the first symbol in the SCH is copied and added to the end of SCH. By doing this, the base station may transmit SCH with 5 OFDM symbols as $Z_1$, $Z_2$, $Z_3$, $Z_4$, and $Z_1$ for the first sub-frame. In the following sub-frames, the base station transmits SCH with $Z_2$, $Z_3$, $Z_4$, $Z_1$, and $Z_2$, and so on.

Each SCH OFDM symbol is constructed using a unique Zadoff-Chu (ZC) sequence populating only the even sub-carriers of the OFDM symbol. As a result, this SCH OFDM symbol, in the time domain, has two identical halves. Thus, the SCH symbol is detected by scanning the air for a symbol with two identical halves using half-symbol correlation as follows:

$$D = \sum_{i=0}^{L/2-1} r_i r^*_{i+L/2},$$

$$E = \sum_{i=0}^{L/2-1} r_{i+L/2} r^*_{i+L/2},$$

$$M = \frac{|D|^2}{E^2},$$

where $r_i$ is the received synchronization data at time i; L is the length of an SCH symbol, which may be 256, or ⅛ of the system bandwidth, for example; D is the correlation between two halves of the SCH symbol; and E is the received power of half a SCH symbol. To tolerate the existing noise, the SCH symbol may be set to be detected if M is larger than a threshold. Then the transmitter slice-ID may be determined by correlating the received SCH symbol with all reference SCH symbols and finding the maximum one, which is also used to confirm the SCH detection.

For a particular embodiment, the received signal is first down sampled by a factor of 8 because, in the above example, the SCH occupies only ⅛ of the system bandwidth. This may be done using decimation filters 902, which may be realized by using a polyphase architecture. This architecture can reduce the clock frequency by a factor of 8. The decimated output is then sent to the buffer 912 and also fed to the symbol-halves correlator 906 and energy estimator 904. The latter two blocks 904 and 906 use a moving-sum method to compute D and E, respectively. With D and E, the SCH symbol detection metric, M, is calculated in the SCH detection trigger 908. Whenever the SCH symbol is in the moving-sum window, M will be above the threshold. As a consequence of the CP in the SCH symbol, M will reach a maximum value and stay at that value for the length of the CP. Thus, a slope detection circuit in the SCH detection trigger 908 can generate a trigger signal to pass the SCH symbol without CP from the buffer 912 to the correlation engine 914.

The correlation engine 914 may comprise a 256-point FFT, a 256-point IFFT, and the reference SCH symbols in the frequency domain. The correlation engine 914 computes all correlations and then the peak searcher 916 compares them to find the maximum one with its index. These two values are sent to the controller, Xilinx Microblaze processor 918, by using an interrupt. The synchronization interrupt routine uses this information along with the time stamp from the time stamper 910 to identify the transmitter and receiver slices to be used for data transmission. For this embodiment, because of usage of the polyphase architecture, the clock frequency of this module is ⅛ of the 552 MHz ADC frequency, which is 69 MHz.

FIG. 10 illustrates an architecture 1000 for beamforming and AGC for a receiver in an MMB system according to an embodiment of the disclosure. The architecture 1000 shown in FIG. 10 is for illustration only. An architecture for beamforming and AGC may be configured in any other suitable manner without departing from the scope of this disclosure.

For the illustrated embodiment, the architecture 1000 comprises a Microblaze processor 1002, an antenna array 1004, a phase-shifter array 1006 and a variable gain amplifier (VGA) 1008. For this embodiment, the Microblaze processor 1002 comprises a beamforming algorithm 1010, which is configured to receive a synchronization state from a synchronization module such as the synchronization module 900, an AGC algorithm 1012, which is configured to receive an energy estimate from an energy estimator such as the energy estimator 904, and a beam table 1014, which is configured to store information corresponding to n beams. For some embodiments, the beamforming algorithm 1010 may correspond to the beamforming module 628, and the AGC algorithm 1012 may correspond to the AGC module 614.

The antenna array 1004 is configured to receive signals transmitted by a transmitter, such as a base station, and to provide the received signals to the phase-shifter array 1006. The phase-shifter array 1006 is configured to receive the signals from the antenna array 1004 and information stored in the beam table 1014 corresponding to a particular beam from the Microblaze processor 1002. Based on the beam information, the phase-shifter array 1006 is also configured to apply a phase shift to the signals received from the antenna array 1004 and to provide the phase-shifted signals to the VGA 1008. The VGA 1008 is configured to receive the phase-shifted signals from the phase-shifter array 1006 and an AGC signal from the Microblaze processor 1002. Based on the AGC signal, the VGA 1008 is also configured to apply a variable gain to the phase-shifted signals received from the phase-shifter array 1006 and to output an amplified, phase-shifted signal.

For this embodiment, a specified number of beams, n, is transmitted. When the synchronization module 900 detects synchronization for one of the beams, as described above in connection with FIG. 9, the synchronization module 900 captures the energy value generated by the energy estimator 904. If that energy value is below a specified range, the AGC algorithm 1012 signals the VGA 1008 to boost the signal. If the energy value is higher than the specified range, the AGC algorithm 1012 signals the VGA 1008 to decrease the signal. In this way, the AGC algorithm 1012 is configured to lock the signal power to a fixed range, thereby flattening the average power coming into the baseband and regulating the power. This procedure may be performed for multiple sub-frames in order to increase the accuracy of the determination of a VGA setting for that beam.

The procedure is then repeated for each of the n beams, and the VGA setting for each beam may be stored in the beam table 1014. After each beam has been processed in this manner, the beam having the lowest VGA setting in the beam table 1014 may be selected as the strongest beam. The Microblaze processor 1002 may also be configured to identify the same beam as the strongest for a certain number of times before changing from one beam to another in order to prevent bouncing between beams.

For a particular embodiment, a two-stage beam pairing algorithm that runs based on the state of the synchronization module 900 is provided. In the first stage, the mobile station first records its receiver slice to the maximum correlated slice detected in the synchronization module 900. Then the mobile station sends the transmitter slice-ID to the base station in the uplink. Later the base station will use this slice to transmit data to this mobile station. However, the quality of the link can be further improved in a second stage by scanning a set of narrower beams within that selected slice in a similar procedure. Then the data is transmitted on the paired narrow beams.

Although it is straightforward for both transmitter and receiver to scan all combinations of transmitter and receiver beams to find the strongest beam direction, this direct search is very time consuming and energy inefficient. For example, in each round, the transmitter fixes its beam at one transmitting direction, and the receiver scans all receiving directions. This whole procedure in total uses $q^2$ SCH OFDM symbols to scan all combinations, where q is the number of narrow beams in each sector.

The two-stage beamforming approach of this disclosure tremendously reduces the number of required SCH OFDM symbols to complete the beam pairing, which is much more suitable for mobile communication. In the first stage, the receiver and transmitter use a wide beam slice, each covering a narrow beams. The receiver and transmitter can detect the strongest beam directions for this wide beam in $q^2/a^2$ OFDM symbols. Then in the second stage, the receiver and transmitter switch to narrow beam mode to scan inside that strongest wide beam. This takes $a^2$ OFDM symbols to find the strongest beam direction for the narrow beam. In total, this algorithm uses $q^2/a+a^2$ OFDM symbols. When a is $\sqrt{q}$, the number of SCH OFDM symbols to detect the strongest beam pair is minimum, 2q, which is much less than the previous $q^2$. In this way, a beamforming algorithm 1010 is provided that can rapidly select the best transmitter and receiver beam pair, which supports a high data rate with low beam pairing overhead.

After finding the best beam pair, the scanning still continues running to track any changes due to mobility and obstructions. Once a better quality pair is found, the mobile station and base station will update the recorded pair for data transmission. As described above, in order to scan for the best beam pair, the signal power at the input of the analog-to-digital converter (ADC) for each beam pair is set to a proper value in the ADC dynamic range. The AGC 1012 at the mobile station baseband adjusts the gain of the RF according to the received power E, which is computed in the synchronization module 900.

In the embodiment illustrated in FIG. 10, analog beamforming comprises two blocks: a specially designed antenna and the baseband control. With a dedicated antenna design, the phase of each antenna is able to be adjusted from the baseband. In the baseband, all of the phase shifters 1006 are controlled by a central beamforming processor 1002. The beamforming algorithm 1010 may be implemented in C code on a Xilinx Microblaze microprocessor 1002 in an FPGA. A predefined table is designed to store different antennas phases. Each entry in the table forms one analog beam. These beams have different directions and different widths. The entry is selected based on the beamforming algorithm 1010, as described above, and the synchronization state from the synchronization module 900. The AGC 1012 may also be implemented in C code on the microprocessor 1002. As described above, the AGC algorithm 1012 adjusts the VGA 1008 in the RF to tune the received signal power to the ADC range.

FIG. 11 illustrates details of a channel estimation module 1100 for a receiver in an MMB system according to an embodiment of the disclosure. The channel estimation module 1100 shown in FIG. 11 is for illustration only. A channel estimation module may be configured in any other suitable manner without departing from the scope of this disclosure.

For some embodiments, the channel estimation module 1100 may correspond to the channel estimation module 640 of the receiver 600 shown in FIG. 6.

The channel estimation module 1100 comprises a channel estimator for each receive (RX) chain. A pseudonoise (PN) sequence generator 1102 is coupled to the channel estimators. Each channel estimator comprises a least-square channel estimator 1106, a noise variance estimator 1108, and $N_{tx}$ linear interpolation filters 1110, and each channel estimator is configured to generate a channel coefficient $\hat{h}_{mn}$ for the corresponding receive chain.

After pairing the transmitter and the receiver beams, as described above in connection with FIG. 10, pilots are sent out to estimate the MIMO channels. In the transmitter, as shown in FIG. 8, pilots from each transmitter chain are first interleaved in the frequency domain, and then are inserted into the data stream at specific subcarriers every six cycles. Although this scheme uses more bandwidth, it can achieve more stable channel estimation.

At the receiver, with the received pilot, the least-square channel estimator 1106 estimates the corresponding channel coefficient $\hat{h}_{mn\_j}$ in the channel matrix $\hat{H}_j^{Lump}$ for subcarrier j by using the least square estimator $\hat{h}_{mn\_j} = p_{mn\_j}$, where $p_{mn\_j}$ is the reference pilot for subcarrier j from transmitter chain n to the receiver chain m; $y_{mn\_j}$ is the received pilot. The linear interpolation filter 1110 then linearly interpolates the estimated channel coefficients to compute the channel coefficients of the subcarriers without the pilot. The noise variance estimator 1108 estimates the complex noise variance $\sigma^2_N$ using guard band subcarriers.

During the channel estimation stage, each receiver chain will receive one complete set of pilots. Thus, in total there are $N_{rx}$ channel estimators working in parallel, one for each receiver chain. Because the receiver chains receive the same set of pilots, one pilot generator may be used. The channels estimated by the channel estimators are stored and used for MIMO detection. By utilizing the fact that pilots and data are received at different OFDM symbols, the channel estimator is further pipelined to reduce the clock frequency. The channel estimation module 1100 may run at 190 MHz, which is the half of the MIMO detector clock frequency.

Figure 12:
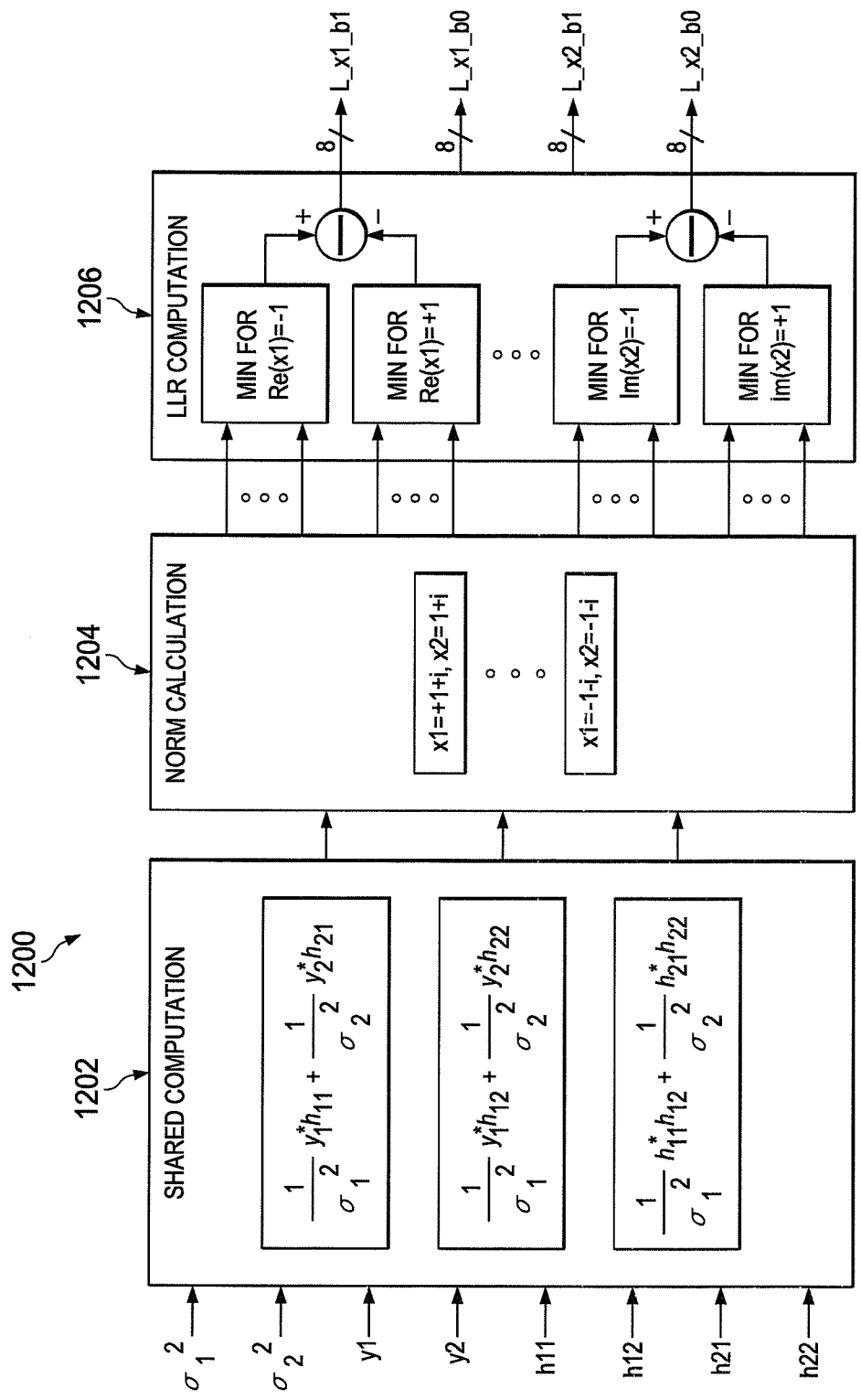
FIG. 12 illustrates details of a MIMO detection module for a receiver in an MMB system according to an embodiment of the disclosure.

FIG. 12 illustrates details of a MIMO detection module 1200 for a receiver in an MMB system according to an embodiment of the disclosure. The MIMO detection module 1200 shown in FIG. 12 is for illustration only. A MIMO detection module may be configured in any other suitable manner without departing from the scope of this disclosure. For some embodiments, the MIMO detection module 1200 may correspond to the MIMO detection module 638 of the receiver 600 shown in FIG. 6.

The illustrated MIMO detection module 1200 is a three-stage module that comprises a shared computation stage 1202, a norm calculation stage 1204 and an LLR computation stage 1206. For some embodiments, the MIMO detection module 1200 may comprise a soft MAP detector. With estimated channel matrix $\hat{H}_{BS\_j}$ for each subcarrier and noise variance $\sigma^2_N$, an a posteriori probability (APP) detector calculates the log-likelihood ratio (LLR) L of bit k. By performing a maxLogAPP approximation, the LLR computation is reduced to:

$$L_k \approx \min_{x \in \chi_{k,-1}} \left\{ \frac{1}{2}(y-Hx)^T C^{-1}(y-Hx) \right\} - \min_{x \in \chi_{k,+1}} \left\{ \frac{1}{2}(y-Hx)^T C^{-1}(y-Hx) \right\},$$

where $x_{k,+1}$ is the set of symbols where bit k is +1; where $x_{k,-1}$ is the set of symbols where bit k is −1; and where C is the covariance matrix.

By assuming the noise signals are independent from each other, in a 2×2 MIMO QPSK receiver, the complexity of the first term, $$\min_{x \in X_{k,-1}} (y - Hx)^T C^{-1}(y - Hx),$$

is reduced to:

$$\min_{x \in X_{k,-1}} \left\{ -2\Re\left(\left(\frac{1}{\sigma_1^2}y_1^* h_{11} + \frac{1}{\sigma_2^2}y_2^* h_{21}\right)x_1\right) - 2\Re\left(\left(\frac{1}{\sigma_1^2}y_1^* h_{12} + \frac{1}{\sigma_2^2}y_2^* h_{22}\right)x_2\right) + 2\Re\left(x_1^* x_2 \left(\frac{1}{\sigma_1^2}h_{11}^* h_{12} + \frac{1}{\sigma_2^2}h_{21}^* h_{22}\right)\right)\right\}.$$

where $\Re()$ is the real part of a complex number; y* is the conjugate of y; $h_{ij}$ is the element in row i and column j of the channel matrix; and $\sigma_i^2$ is the noise variance of receiver chain i. The same simplification is also performed for the other term, $$\min_{x \in X_{k,+1}} (y - Hx)^T C^{-1}(y - Hx).$$

The illustrated MIMO detection module 1200 is designed with three stages for high data rate and low complexity. Re( ) and Im( ) indicate the real and imaginary parts, respectively, in FIG. 12. To reduce complexity, the first stage 1202 is configured to compute all shared terms for $x_1$ and $x_2$. The second stage 1204 is configured to compute the 2-norm values of different combinations of $x_1$ and $x_2$ in parallel. In a 2×2 MIMO and QPSK system, 16 terms are computed. The third stage 1206 is configured to compute LLRs by searching for the minimum value from these 16 computed 2-norms. This highly pipelined architecture supports the design to run up to 380 MHz, which is close to the maximum limit of the FPGA. The throughput of this embodiment of the MIMO detection module 1200 is up to 1.52 Gbps.

Figure 13:
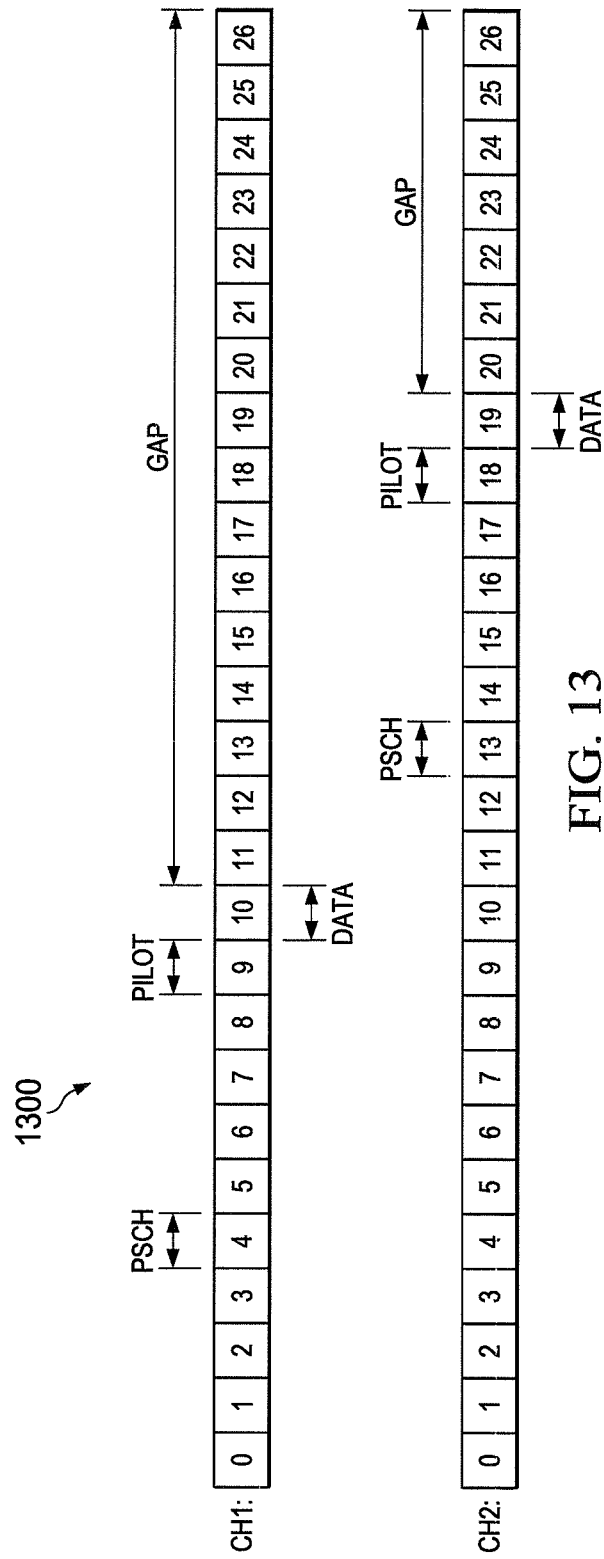
FIG. 13 illustrates MIMO feedback by a receiver in an MMB system according to an embodiment of the disclosure.

FIG. 13 illustrates MIMO feedback 1300 by a receiver in an MMB system according to an embodiment of the disclosure. The MIMO feedback 1300 shown in FIG. 13 is for illustration only. MIMO feedback may be provided by the receiver in any other suitable manner without departing from the scope of this disclosure.

For a particular embodiment, MIMO feedback may be provided through beam-id only feedback, beam-id plus MIMO precoder feedback, or beam-id plus MIMO assuming channel reciprocity feedback. For beam-id only feedback, the synchronization and beamforming slot and the uplink slot need not include pilot or data symbols. Instead, the existence of a primary synchronization channel (PSCH) sequence in a given beam-period is sufficient. For this embodiment, the mobile station may scan for PSCH for a specified period of time (e.g., 7 ms) and select the best beam (e.g., the best 1 ms among the 7 ms).

For beam-id plus MIMO precoder feedback, the mobile station may feedback the quantized 2×2 precoding matrix, with four bits for each element. For beam-id plus MIMO assuming channel reciprocity feedback, the mobile station may send pilots in the uplink slot. The base station may then estimate the uplink channel from the pilot received in the uplink slot.

Figure 14:
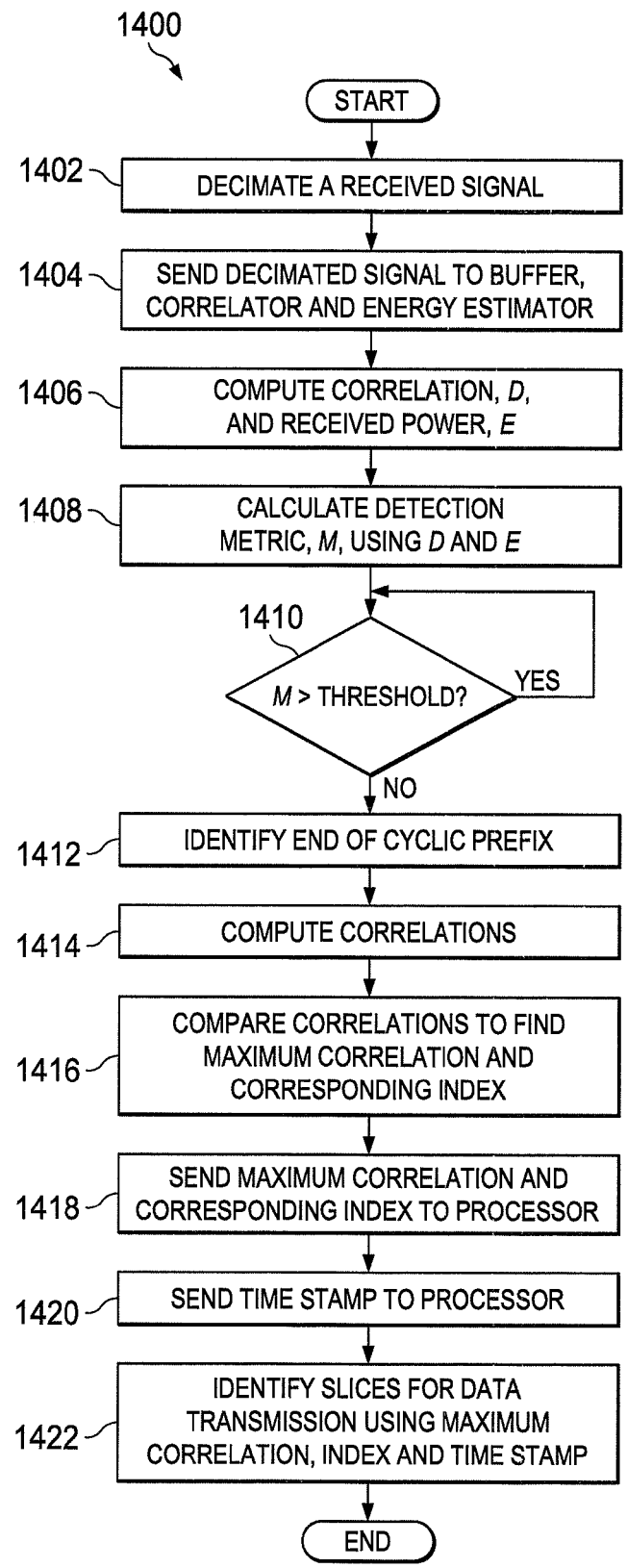
FIG. 14 illustrates a method for providing synchronization in a receiver in an MMB system according to an embodiment of the disclosure.

FIG. 14 illustrates a method 1400 for providing synchronization in a receiver in an MMB system according to an embodiment of the disclosure. The method shown in FIG. 14 is for illustration only. Synchronization may be provided in the receiver in any other suitable manner without departing from the scope of this disclosure.

Initially, a decimation filter 902 down samples a received signal by a factor of 8 (step 1402). The decimation filter 902 then sends the decimated output to a buffer 912, to a symbol-halves correlator 906 and to an energy estimator 904 (step 1404). The symbol-halves correlator 906 computes the correlation between two halves of the SCH symbol (i.e., D), and the energy estimator 904 computes the received power of half an SCH symbol (i.e., E) (step 1406).

The SCH detection trigger 908 calculates the SCH symbol detection metric, M, using D and E (step 1408). The SCH detection trigger 908 compares M to a threshold (step 1410). If M is above the threshold (step 1410), the SCH symbol is in the moving-sum window because M has reached a maximum value at which it will remain for the length of the CP, and the SCH detection trigger 908 will continue to monitor the value of M (step 1410).

When M drops below the threshold (step 1410), the SCH detection trigger 908 identifies the end of the CP and generates a trigger signal to pass the SCH symbol without CP from the buffer 912 to the correlation engine 914 (step 1412).

The correlation engine 914 computes the correlations (step 1414), and the peak searcher 916 compares the correlations to find the maximum one with its index (step 1416). The peak searcher 916 sends these two values to the Microblaze processor 918 (step 1418). A time stamper 910 sends a time stamp corresponding to the end of the CP to the Microblaze processor 918 (step 1420). A synchronization interrupt routine of the Microblaze processor 918 uses the two values received from the peak searcher 916, along with the time stamp received from the time stamper 910, to identify the transmitter and receiver slices to be used for data transmission (step 1422).

Figure 15:
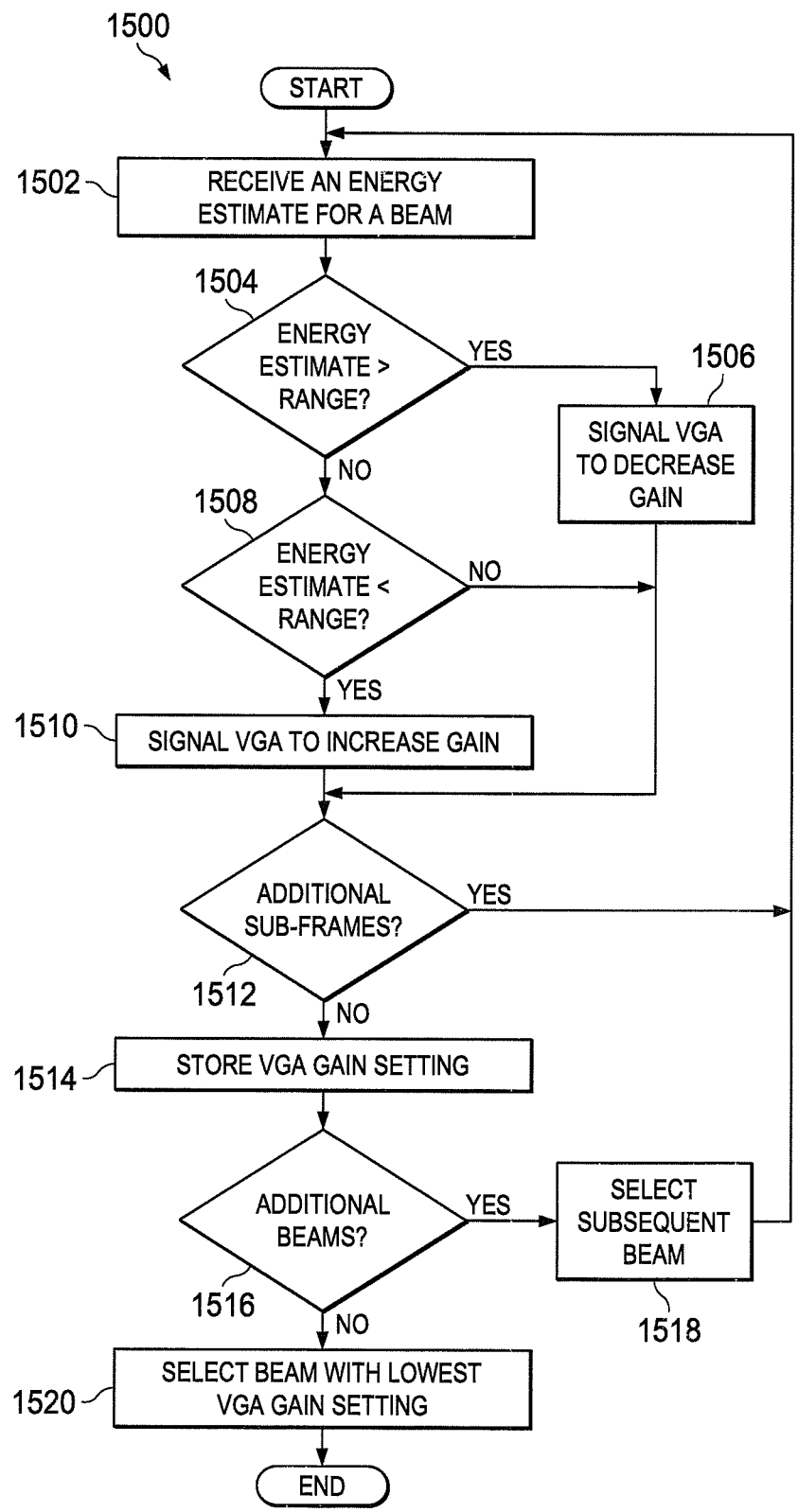
FIG. 15 illustrates a method for providing AGC in a receiver in an MMB system according to an embodiment of the disclosure.

FIG. 15 illustrates a method 1500 for providing AGC in a receiver in an MMB system according to an embodiment of the disclosure. The method shown in FIG. 15 is for illustration only. AGC may be provided in the receiver in any other suitable manner without departing from the scope of this disclosure.

Initially, an AGC module 1012 receives an energy estimate from the energy estimator 904 of the synchronization module 900 for a specified beam (step 1502). If the energy estimate is greater than a predefined range (step 1504), the AGC module 1012 signals a VGA 1008 to decrease the gain (step 1506). If the energy estimate is lower than the predefined range (step 1508), the AGC module 1012 signals the VGA 1008 to increase the gain (step 1510).

The AGC module 1012 then determines whether to continue training for the selected beam on a subsequent sub-frame (step 1512). If the AGC module 1012 determines that training should continue for additional sub-frames for the selected beam (for example, if a certain number of sub-frames have not already been used for training on that beam) (step 1512), the AGC module 1012 receives another energy estimate for that beam on the next sub-frame, which includes any adjustments made to the VGA setting (step 1502).

Once no additional sub-frames remain to be used for training for the beam (step 1512), the AGC module 1012 stores the final VGA gain setting for that beam in the beam table 1014 (step 1514). The AGC module 1012 then determines whether additional beams remain to be selected for training (step 1516). If so, the AGC module 1012 selects the next beam for training (step 1518) and receives a first energy estimate for the next beam (step 1502). Once AGC training is completed for each beam (step 1516), the AGC module 1012 selects the beam with the lowest VGA gain setting as the beam for communication (step 1520).

Although FIG. 15 illustrates one example of a method for providing AGC in a receiver, various changes may be made to FIG. 15. For example, instead of coming to an end, the method 1500 may continue to repeat so that the AGC module 1012 is continuously monitoring the energy estimates for the beams and storing updated VGA gain settings for those beams in the beam table 1014.

Figure 16:
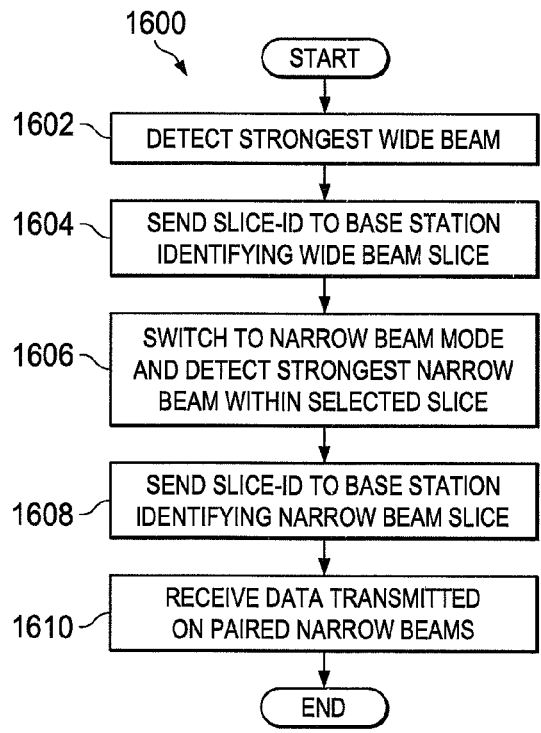
FIG. 16 illustrates a method for providing beamforming in a receiver in an MMB system according to an embodiment of the disclosure.

FIG. 16 illustrates a method 1600 for providing beamforming in a receiver, such as a mobile station, in an MMB system according to an embodiment of the disclosure. The method shown in FIG. 16 is for illustration only. Beamforming may be provided in the receiver in any other suitable manner without departing from the scope of this disclosure.

Initially, the mobile station detects the strongest beam direction for a wide beam for communicating with a base station (step 1602). Then the mobile station sends a transmitter slice-ID to the base station in the uplink identifying the wide beam slice (step 1604). The mobile station then switches to narrow beam mode to scan a set of narrower beams within that selected slice and detect the strongest beam direction for a narrow beam (step 1606). The mobile station then sends a slice-ID to the base station in the uplink identifying the narrow beam slice (step 1608). The mobile station then receives data that is transmitted on the paired narrow beams (step 1610).

Although FIG. 16 illustrates one example of a method for providing beamforming in a receiver, various changes may be made to FIG. 16. For example, instead of coming to an end, the method 1600 may continue to repeat so that the mobile station is continuously monitoring beams for the strongest beam pair.

Figure 17:
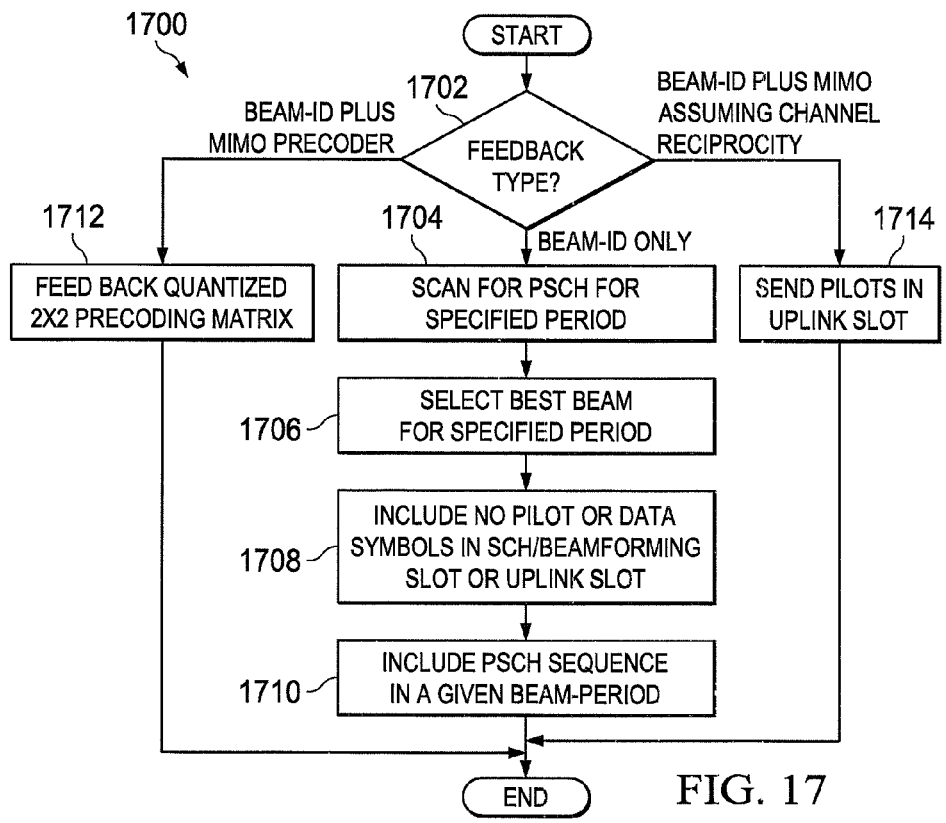
FIG. 17 illustrates a method for providing MIMO feedback in a receiver in an MMB system according to an embodiment of the disclosure.

FIG. 17 illustrates a method 1700 for providing MIMO feedback in a receiver in an MMB system according to an embodiment of the disclosure. The method shown in FIG. 17 is for illustration only. MIMO feedback may be provided in the receiver in any other suitable manner without departing from the scope of this disclosure.

Initially, the receiver may determine whether to provide beam-id only feedback, beam-id plus MIMO precoder feedback, or beam-id plus MIMO assuming channel reciprocity feedback (step 1702). For beam-id only feedback (step 1702), the receiver scans for PSCH for a specified period of time (e.g., 7 ms) (step 1704) and selects the best beam (e.g., the best 1 ms among the 7 ms) for that time period (step 1706). Then the receiver includes no pilot or data symbols in either the synchronization and beamforming slot or the uplink slot (step 1708). Instead, the receiver includes a PSCH sequence in a given beam-period (step 1710).

For beam-id plus MIMO precoder feedback (step 1702), the receiver feeds back a quantized 2×2 precoding matrix, with four bits for each element (step 1712). For beam-id plus MIMO assuming channel reciprocity feedback (step 1702), the receiver sends pilots in the uplink slot (step 1714). The base station may then estimate the uplink channel from the pilot received in the uplink slot.

Although FIG. 17 illustrates one example of a method for providing synchronization in a receiver, various changes may be made to FIG. 17. For example, the receiver may be configured for a particular type of MIMO feedback instead of determining which of multiple MIMO feedback methods to implement.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, steps may be combined and/or performed in any suitable order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiver in a communication system, comprising:
a synchronization module configured to identify an end of a cyclic prefix (CP) in a received signal using slope detection by monitoring a detection metric threshold in the received signal, wherein the synchronization module comprises an energy estimator configured to estimate an energy value corresponding to the received signal, and wherein the synchronization module is further configured, when the synchronization module identifies the end of the CP, to:
capture the energy value generated by the energy estimator for use in beamforming and automatic gain control, and
select a beam with a lowest corresponding gain for communication; and
a channel estimator configured to estimate a complex noise variance using guard band subcarriers.

2. The receiver of claim 1, wherein the synchronization module comprises a synchronization channel (SCH) detection trigger configured to compare a first value of the detection metric threshold to a second value of the detection metric threshold, wherein the first value and the second value are separated in time by a length of the CP.

3. The receiver of claim 2, wherein the SCH detection trigger is further configured to identify the end of the CP when the second value becomes lower than the first value.

4. The receiver of claim 1, wherein the received signal comprises an SCH sub-frame, and wherein a first symbol of the SCH sub-frame is duplicated in a last symbol of the SCH sub-frame.

5. The receiver of claim 1, wherein the synchronization module comprises a symbol-halves correlator configured to detect an SCH symbol by scanning the air for a symbol with two identical halves using half-symbol correlation.

6. The receiver of claim 5, wherein the synchronization module comprises a correlation engine and a peak searcher, wherein the synchronization module is further configured to generate a trigger signal to pass the SCH symbol without the CP to the correlation engine when the SCH symbol is detected, wherein the correlation engine is configured to compute correlations for the SCH symbol, wherein the peak searcher is configured to identify a maximum one of the correlations, and wherein transmitter and receiver slices to be used for data transmission are identified based on the maximum correlation.

7. A method for selecting a beam for communication in a receiver in a communication system, comprising:

receiving a signal;
estimating an energy value corresponding to the received signal;
capturing the energy value generated for use in beam-forming and automatic gain control;
for each of a plurality of beams, performing automatic gain control for a specified number of sub-frames to determine a gain corresponding to the beam; and
selecting the beam having the lowest corresponding gain for communication.

8. The method of claim 7, further comprising, for each of the plurality of beams, storing the gain corresponding to the beam.

9. The method of claim 7, wherein performing automatic gain control comprises:
receiving an energy estimate for the beam; and
decreasing the gain for the beam if the energy estimate is greater than a predefined range and increasing the gain for the beam if the energy estimate is lower than the predefined range.

10. The method of claim 7, further comprising:
repeatedly performing automatic gain control cycles for each of the plurality of beams for the specified number of sub-frames; and
wherein selecting the beam comprises selecting the beam when the beam has the lowest corresponding gain for a specified number of automatic gain control cycles.

11. A method for beamforming in a receiver in a communication system, comprising:
receiving a signal;
estimating an energy value corresponding to the received signal;
capturing the energy value generated by the energy estimator for use in beamforming and automatic gain control;
selecting a wide beam with a lowest corresponding gain for communication;
detecting a strongest beam direction for the wide beam for communicating with a base station;
sending a slice-identifier to the base station identifying the wide beam;
scanning a set of narrow beams within the wide beam;
detecting a strongest beam direction for one of the narrow beams for communicating with the base station;
sending a slice-identifier to the base station identifying the narrow beam; and
receiving data transmitted on the narrow beam.

12. The method of claim 11, further comprising feeding back beam identifiers without pilot and data symbols.

13. The method of claim 12, further comprising including a primary synchronization channel (PSCH) sequence in a specified beam-period.

14. The method of claim 13, further comprising scanning for the PSCH for a specified time to select a beam.

15. The method of claim 11, further comprising identifying an end of a CP in the received data using slope detection.

16. The method of claim 11, further comprising:
for each of a plurality of beams, performing automatic gain control for a specified number of sub-frames to determine a gain corresponding to the beam; and
detecting the beam direction for the beam having the lowest corresponding gain as the strongest beam direction.

17. The method of claim 16, wherein performing automatic gain control comprises:
receiving an energy estimate for the beam; and
decreasing the gain for the beam if the energy estimate is greater than a predefined range and increasing the gain for the beam if the energy estimate is lower than the predefined range.

18. The method of claim 11, further comprising estimating a complex noise variance using guard band subcarriers.

* * * * *